US012046222B2

(12) United States Patent
Packouz

(10) Patent No.: US 12,046,222 B2
(45) **Date of Patent: *Jul. 23, 2024**

(54) SYNTHESIZED PERCUSSION PEDAL AND LOOPING STATION

(71) Applicant: Intelliterran, Inc., Aventura, FL (US)

(72) Inventor: David Packouz, Aventura, FL (US)

(73) Assignee: Intelliterran, Inc., Aventura, FL (US)

( * ) Notice: Subject to any disclaimer, the term of this patent is extended or adjusted under 35 U.S.C. 154(b) by 525 days.

This patent is subject to a terminal disclaimer.

(21) Appl. No.: 17/209,343

(22) Filed: Mar. 23, 2021

(65) Prior Publication Data

US 2021/0210059 A1 Jul. 8, 2021

Related U.S. Application Data

(63) Continuation of application No. 16/989,748, filed on Aug. 10, 2020, now Pat. No. 10,957,296, which is a (Continued)

(51) Int. Cl.

| | |
|---|---|
| ***G10H 1/34*** | (2006.01) |
| ***G10H 1/00*** | (2006.01) |
| ***G10H 1/42*** | (2006.01) |

(52) U.S. Cl.

CPC .......... *G10H 1/348* (2013.01); *G10H 1/0066* (2013.01); *G10H 1/42* (2013.01);

(Continued)

(58) Field of Classification Search

CPC ........ G10H 1/348; G10H 1/0066; G10H 1/42; G10H 2210/346; G10H 2210/371;

(Continued)

(56) References Cited

U.S. PATENT DOCUMENTS

| | | | |
|---|---|---|---|
| 3,649,736 | A | 3/1972 | Van Der Kooij |
| 3,691,894 | A | 9/1972 | Schneider et al. |

(Continued)

FOREIGN PATENT DOCUMENTS

| | | |
|---|---|---|
| CA | 3039257 | 4/2008 |
| CN | 109891496 A | 6/2019 |

(Continued)

OTHER PUBLICATIONS

Copending U.S. Appl. No. 17/307,695, filed May 4, 2021, Inventor: Packouz.

(Continued)

*Primary Examiner* — Christina M Schreiber

(74) *Attorney, Agent, or Firm* — BEKIARES ELIEZER LLP

(57) ABSTRACT

An apparatus for facilitating control of midi-sequence generation is disclosed. The apparatus may include a midi-sequence module configured to store a plurality of main midi sequences, store a plurality of fill midi sequences, and playback a plurality of main midi sequences and the plurality of fill midi sequences. The apparatus can also include a first foot-operable switch configured to operate the midi-sequence module, an instrument input, and a looping means configured to record a plurality of signals received from the instrument input, generate a plurality of recorded loops associated with the plurality of recorded signals, store the plurality of recorded loops, and playback each of the plurality of recorded loops. The apparatus can also include a second foot-operable switch configured to operate the looping means.

20 Claims, 15 Drawing Sheets

Related U.S. Application Data continuation of application No. 16/712,193, filed on Dec. 12, 2019, now Pat. No. 10,741,154, which is a continuation of application No. 15/861,369, filed on Jan. 3, 2018, now Pat. No. 10,546,568, which is a continuation of application No. 15/284,769, filed on Oct. 4, 2016, now Pat. No. 9,905,210, which is a continuation-in-part of application No. 14/216,879, filed on Mar. 17, 2014, now Pat. No. 9,495,947.

(60) Provisional application No. 61/913,087, filed on Dec. 6, 2013.

(52) U.S. Cl.
CPC . *G10H 2210/346* (2013.01); *G10H 2210/371* (2013.01); *G10H 2220/106* (2013.01); *G10H 2240/211* (2013.01); *G10H 2240/285* (2013.01); *G10H 2250/641* (2013.01)

(58) Field of Classification Search
CPC ....... G10H 2220/106; G10H 2240/211; G10H 2240/285; G10H 2250/641
USPC .......................................................... 84/603
See application file for complete search history.

(56) References Cited

U.S. PATENT DOCUMENTS

| | | | | |
|---|---|---|---|---|
| 3,898,397 | A | 8/1975 | Devore et al. | |
| 4,168,647 | A | 9/1979 | Petillo | |
| 4,339,980 | A | 7/1982 | Hooke et al. | |
| D279,905 | S | 7/1985 | Whited | |
| 4,899,636 | A | 2/1990 | Chiba et al. | |
| 5,105,711 | A | 4/1992 | Barnard | |
| 5,117,285 | A | 5/1992 | Nelson et al. | |
| 5,166,467 | A | 11/1992 | Brown | |
| 5,192,823 | A | 3/1993 | Suzuki et al. | |
| 5,223,655 | A | 6/1993 | Watanabe et al. | |
| 5,296,641 | A | 3/1994 | Stelzel | |
| 5,308,916 | A | 5/1994 | Murata et al. | |
| 5,421,236 | A | 6/1995 | Sanger | |
| 5,502,275 | A | 3/1996 | Kondo et al. | |
| 5,637,820 | A | 6/1997 | Wittman | |
| 5,675,376 | A | 10/1997 | Andersson et al. | |
| 5,760,326 | A * | 6/1998 | Ishibashi | G10H 1/02 84/669 |
| 5,786,540 | A | 7/1998 | Westlund | |
| 5,837,912 | A | 11/1998 | Eagen | |
| 5,845,240 | A | 12/1998 | Fielder | |
| 5,866,829 | A | 2/1999 | Pecoraro | |
| 5,877,444 | A | 3/1999 | Hine et al. | |
| 5,915,288 | A | 6/1999 | Gabriel | |
| 5,986,200 | A | 11/1999 | Curtin | |
| 6,084,170 | A | 7/2000 | Laroche | |
| 6,121,532 | A | 9/2000 | Kay | |
| 6,166,314 | A | 12/2000 | Weinstock et al. | |
| 6,215,055 | B1 | 4/2001 | Saravis | |
| 6,257,535 | B1 | 7/2001 | Jaing | |
| 6,574,685 | B1 | 6/2003 | Schwartz et al. | |
| 6,924,425 | B2 * | 8/2005 | Naples | G10H 1/365 84/610 |
| 6,960,715 | B2 | 11/2005 | Riopelle | |
| 7,015,390 | B1 | 3/2006 | Rogers | |
| 7,074,998 | B2 | 7/2006 | Hurwicz | |
| 7,220,913 | B2 | 5/2007 | Juszkiewicz et al. | |
| 7,247,789 | B2 | 7/2007 | Fishman et al. | |
| 7,262,359 | B1 | 8/2007 | Edwards, Sr. et al. | |
| 7,294,777 | B2 | 11/2007 | Hofmeister et al. | |
| 7,355,110 | B2 | 4/2008 | Nash | |
| 7,373,210 | B2 | 5/2008 | Pennock et al. | |
| 7,427,705 | B2 | 9/2008 | Rubens | |
| 7,504,577 | B2 | 3/2009 | Riopelle | |
| 7,541,536 | B2 | 6/2009 | Daniel | |
| 7,592,533 | B1 | 9/2009 | Lee | |
| 7,608,776 | B2 | 10/2009 | Ludwig | |
| 7,636,658 | B2 | 12/2009 | Campbell et al. | |
| 7,671,268 | B2 | 3/2010 | Nicoll | |
| 7,678,985 | B2 | 3/2010 | Adams et al. | |
| 7,754,956 | B2 | 7/2010 | Gain et al. | |
| 7,844,069 | B2 | 11/2010 | Banks | |
| 7,923,623 | B1 | 4/2011 | Beaty | |
| 8,035,025 | B1 | 10/2011 | Donnell | |
| 8,093,486 | B2 | 1/2012 | Behringer et al. | |
| 8,106,283 | B2 | 1/2012 | Nishitani et al. | |
| 8,180,063 | B2 | 5/2012 | Henderson | |
| 8,217,253 | B1 | 7/2012 | Beaty | |
| 8,253,776 | B2 | 8/2012 | Chen et al. | |
| 8,324,494 | B1 * | 12/2012 | Packouz | G10H 1/42 84/746 |
| 8,338,689 | B1 | 12/2012 | Beaty | |
| D680,502 | S | 4/2013 | McMillen | |
| 8,431,811 | B2 | 4/2013 | Riopelle | |
| 8,455,749 | B1 | 6/2013 | Gage et al. | |
| 8,785,760 | B2 | 7/2014 | Serletic et al. | |
| 8,816,180 | B2 * | 8/2014 | Georges | G10H 1/0025 84/622 |
| 8,818,173 | B2 | 8/2014 | Wallace | |
| 8,835,739 | B2 | 9/2014 | Bencar et al. | |
| 8,835,740 | B2 | 9/2014 | Riopelle | |
| 8,847,057 | B2 | 9/2014 | Koah | |
| 8,865,992 | B2 | 10/2014 | Shavit | |
| 8,872,014 | B2 * | 10/2014 | Sandler | G06F 17/00 84/723 |
| 8,907,191 | B2 | 12/2014 | Seese, Jr. et al. | |
| 8,908,008 | B2 | 12/2014 | Tan et al. | |
| 9,012,756 | B1 | 4/2015 | Goldman et al. | |
| 9,047,850 | B1 | 6/2015 | Beaty | |
| 9,088,693 | B2 | 7/2015 | Pham et al. | |
| 9,274,745 | B2 | 3/2016 | Clements et al. | |
| 9,286,872 | B2 * | 3/2016 | Packouz | G10H 3/186 |
| 9,443,501 | B1 | 9/2016 | Adam | |
| 9,495,947 | B2 * | 11/2016 | Packouz | G10H 1/0066 |
| 9,595,248 | B1 * | 3/2017 | Classe | G06F 3/165 |
| 9,691,429 | B2 | 6/2017 | Leiberman et al. | |
| 9,721,551 | B2 | 8/2017 | Silverstein | |
| 9,843,404 | B2 | 12/2017 | Kiely et al. | |
| 9,852,216 | B2 | 12/2017 | Belcher et al. | |
| 9,892,720 | B2 * | 2/2018 | Packouz | G10H 1/42 |
| 9,905,210 | B2 * | 2/2018 | Packouz | G10H 1/0066 |
| 9,953,624 | B2 | 4/2018 | Baker et al. | |
| 9,966,053 | B2 * | 5/2018 | Mayo | G10H 1/0083 |
| 10,421,013 | B2 * | 9/2019 | Challinor | G06F 3/0482 |
| 10,546,568 | B2 | 1/2020 | Packouz | |
| 10,741,154 | B2 * | 8/2020 | Packouz | G10H 1/348 |
| 10,741,155 | B2 * | 8/2020 | Packouz | G10H 1/42 |
| 10,957,296 | B2 * | 3/2021 | Packouz | G10H 1/0066 |
| 10,997,958 | B2 * | 5/2021 | Packouz | G10H 1/42 |
| 11,688,377 | B2 * | 6/2023 | Packouz | G10H 1/348 84/603 |
| 2001/0015123 | A1 | 8/2001 | Nishitani et al. | |
| 2001/0035087 | A1 * | 11/2001 | Subotnick | G10H 1/0008 84/600 |
| 2002/0035616 | A1 | 3/2002 | Diamond et al. | |
| 2002/0111703 | A1 | 8/2002 | Cole | |
| 2003/0110929 | A1 * | 6/2003 | Riopelle | G10H 1/20 84/615 |
| 2003/0171933 | A1 | 9/2003 | Perille | |
| 2003/0196542 | A1 | 10/2003 | Harrison, Jr. | |
| 2004/0136549 | A1 | 7/2004 | Pennock et al. | |
| 2004/0144241 | A1 | 7/2004 | Juskiewicz et al. | |
| 2004/0159214 | A1 | 8/2004 | Tsuge et al. | |
| 2004/0159222 | A1 | 8/2004 | Pennock et al. | |
| 2005/0241466 | A1 | 11/2005 | Riopelle | |
| 2006/0000347 | A1 | 1/2006 | Preece | |
| 2006/0159291 | A1 | 7/2006 | Fliegler et al. | |
| 2006/0266200 | A1 | 11/2006 | Goodwin | |
| 2007/0000375 | A1 | 1/2007 | Harrison, Jr. | |
| 2007/0068371 | A1 | 3/2007 | Weir | |
| 2007/0136769 | A1 | 6/2007 | Goldberg et al. | |
| 2007/0234880 | A1 | 10/2007 | Adams et al. | |
| 2007/0234888 | A1 | 10/2007 | Rotolo de Moraes | |
| 2008/0028920 | A1 | 2/2008 | Sullivan | |

(56) References Cited

U.S. PATENT DOCUMENTS

| | | | | |
|---|---|---|---|---|
| 2008/0053293 | A1 | 3/2008 | Georges et al. | |
| 2008/0156180 | A1 | 7/2008 | Bagale | |
| 2008/0167740 | A1 | 7/2008 | Merrill | |
| 2008/0212439 | A1 | 9/2008 | Chan et al. | |
| 2008/0229914 | A1 | 9/2008 | Nathanial | |
| 2009/0221369 | A1 | 9/2009 | Riopelle | |
| 2009/0229449 | A1* | 9/2009 | Yamada | G10H 1/348 84/612 |
| 2010/0037755 | A1 | 2/2010 | McMillen et al. | |
| 2010/0087937 | A1 | 4/2010 | Tolson | |
| 2010/0180755 | A1 | 7/2010 | Copeland et al. | |
| 2010/0307325 | A1 | 12/2010 | Appel | |
| 2011/0023691 | A1 | 2/2011 | Iwase et al. | |
| 2011/0088536 | A1 | 4/2011 | McMillen et al. | |
| 2011/0095874 | A1 | 4/2011 | Bennett | |
| 2011/0112672 | A1 | 5/2011 | Brown et al. | |
| 2011/0143837 | A1 | 6/2011 | Riopelle | |
| 2011/0271820 | A1 | 11/2011 | Cockerell et al. | |
| 2011/0299238 | A1 | 12/2011 | Radin et al. | |
| 2012/0097014 | A1 | 4/2012 | Matsumoto | |
| 2012/0144981 | A1 | 6/2012 | Ciccone | |
| 2012/0160079 | A1 | 6/2012 | Little et al. | |
| 2012/0263432 | A1 | 10/2012 | Shore | |
| 2012/0266741 | A1 | 10/2012 | Bencar et al. | |
| 2012/0297962 | A1 | 11/2012 | O'Donnell et al. | |
| 2013/0030559 | A1 | 1/2013 | Estes | |
| 2013/0053993 | A1 | 2/2013 | Setoguchi | |
| 2013/0058507 | A1 | 3/2013 | Arknæs-Pedersen et al. | |
| 2013/0118340 | A1 | 5/2013 | D'Amours | |
| 2013/0138233 | A1 | 5/2013 | Sandler et al. | |
| 2013/0154920 | A1 | 6/2013 | Radin et al. | |
| 2013/0182856 | A1 | 7/2013 | Setoguchi | |
| 2013/0201398 | A1 | 8/2013 | Radin et al. | |
| 2013/0291708 | A1 | 11/2013 | Orshan | |
| 2013/0292524 | A1 | 11/2013 | Canivell Grifols et al. | |
| 2013/0297844 | A1 | 11/2013 | Rosenberg et al. | |
| 2013/0298752 | A1 | 11/2013 | Juszkiewicz | |
| 2013/0312588 | A1 | 11/2013 | Orshan | |
| 2014/0123838 | A1 | 5/2014 | D'Amours | |
| 2014/0202316 | A1 | 7/2014 | Szalay et al. | |
| 2014/0202320 | A1 | 7/2014 | White et al. | |
| 2014/0238221 | A1 | 8/2014 | Roberts et al. | |
| 2014/0331850 | A1 | 11/2014 | Cho | |
| 2015/0013526 | A1 | 1/2015 | Packouz et al. | |
| 2015/0046824 | A1 | 2/2015 | Humphrey et al. | |
| 2015/0066780 | A1 | 3/2015 | Cohen et al. | |
| 2015/0094833 | A1 | 4/2015 | Clements et al. | |
| 2015/0154948 | A1 | 6/2015 | Urry et al. | |
| 2015/0161973 | A1* | 6/2015 | Packouz | G10H 1/42 84/746 |
| 2015/0161978 | A1* | 6/2015 | Packouz | G10H 1/0066 84/746 |
| 2016/0103844 | A1 | 4/2016 | Belcher et al. | |
| 2016/0335996 | A1 | 11/2016 | Wardlow | |
| 2017/0025107 | A1* | 1/2017 | Packouz | G10H 1/348 |
| 2017/0025108 | A1* | 1/2017 | Packouz | G10H 1/348 |
| 2017/0041357 | A1 | 2/2017 | Wang et al. | |
| 2017/0041359 | A1 | 2/2017 | Kwan | |
| 2017/0092251 | A1 | 3/2017 | Mizrahi | |
| 2018/0009631 | A1 | 1/2018 | Krishnamurthy et al. | |
| 2018/0130452 | A1* | 5/2018 | Packouz | G10H 1/42 |
| 2018/0261197 | A1* | 9/2018 | Ceccolini | G10H 1/02 |
| 2019/0051273 | A1* | 2/2019 | Fryette | G10H 3/186 |
| 2019/0058423 | A1 | 2/2019 | Knoedgen | |
| 2019/0066643 | A1* | 2/2019 | Packouz | B60H 1/0025 |
| 2019/0103080 | A1* | 4/2019 | Decker | G10H 1/40 |
| 2019/0229666 | A1 | 7/2019 | Zhou et al. | |
| 2020/0037288 | A1* | 1/2020 | Huang | H04W 72/30 |
| 2020/0043453 | A1* | 2/2020 | Lang | G10H 1/0008 |
| 2020/0118532 | A1* | 4/2020 | Packouz | G10H 1/0066 |
| 2020/0126528 | A1* | 4/2020 | Packouz | G10H 1/348 |
| 2020/0202828 | A1* | 6/2020 | Scherbacovsky | G10H 1/348 |
| 2020/0372886 | A1 | 11/2020 | Packouz | |
| 2020/0372887 | A1 | 11/2020 | Packouz | |
| 2021/0210059 | A1* | 7/2021 | Packouz | G10H 1/0066 |
| 2021/0287646 | A1* | 9/2021 | Packouz | G10H 1/18 |
| 2021/0304717 | A1* | 9/2021 | Packouz | G10H 1/42 |
| 2022/0238088 | A1* | 7/2022 | Danjyo | G10G 1/04 |
| 2024/0071346 | A1 | 2/2024 | Packouz | |

FOREIGN PATENT DOCUMENTS

| | | | |
|---|---|---|---|
| CN | 109891496 | B | 1/2024 |
| CN | 109891596 | B | 1/2024 |
| DE | 102007034806 | A1 | 2/2009 |
| EP | 1973099 | A2 | 9/2008 |
| EP | 1974099 | A2 | 9/2008 |
| EP | 2638829 | A1 | 9/2013 |
| EP | 2950303 | A1 | 12/2015 |
| EP | 3929912 | A1 | 12/2021 |
| ES | 2412605 | | 7/2013 |
| ES | 2495940 | | 9/2014 |
| ES | 2510966 | | 10/2014 |
| JP | 7219545 | A | 8/1995 |
| JP | 2013171070 | A | 9/2013 |
| WO | 2012058646 | A1 | 5/2012 |
| WO | 2012062939 | A1 | 5/2012 |
| WO | 2014114833 | A1 | 7/2014 |
| WO | 2015118195 | A1 | 8/2015 |
| WO | 2015193526 | A1 | 12/2015 |
| WO | 2018067124 | A1 | 4/2018 |
| WO | 2019046487 | A1 | 3/2019 |

OTHER PUBLICATIONS

Jones et al., "Achieving Eye Contact in a One-to-Many 3D Video Teleconferencing System", Fakespace Labs, University of Southern California, http://ict.usc.edu/pubs/Achieving%20Eye%20Contact%20in%20a%20One-to-Many%203D%20Video%20Teleconferencing%20System.pdf, 8 pgs.

Gore, "Amped-Up Acoustic Guitars", https://www.seymourduncan.com/tonefiend/effects/amped-up-acoustic/, 2012, 4 pgs.

ToneWorks Hyperformance Products KORG, "Pandora PXR4 Digital Recording Studio," Owners Manual, 2001 Korg Inc., Tokyo, Japan, https://www.manualslib.com/manual/258008/Korg-Toneworks-Pxr4.html, 99 pgs.

Yamaha MFC10 MIDI Foot Controller, Owner's Manual, https://usa.yamaha.com/files/download/other_assets/5/317935/MFC10E.pdf, 41 pgs.

IK Multimedia—iRig BlueBoard, https://www.ikmultimedia.com/products/irigblueboard/, 1996-2019, 16 pgs.

Una, The $10 Ableton Footcontroller—YouTube, https://www.youtube.com/watch?v=VxaClh7FACw, Jul. 29, 2007, 3 pgs.

Myvoiceismypassport, Ableton Live Foot Controller "ability"—YouTube, https://www.youtube.com/watch?v=9FCQSIC26uw, Nov. 7, 2006, 2 pgs.

International Search Report and Written Opinion dated Dec. 27, 2016 cited in Application No. PCT/US16/55312, 9 pgs.

International Search Report and Written Opinion dated Nov. 7, 2018 cited in Application No. PCT/US18/48637, 13 pgs.

"Ableton Live Foot Controller", www.youtube.com/watch?v=9FCQSIC26us upload to YouTube, Nov. 7, 2006, viewed online on May 14, 2015.

U.S. Non-Final Office Action dated May 22, 2015 cited in U.S. Appl. No. 14/216,879, 14 pgs.

U.S. Non-Final Office Action dated Jun. 9, 2015 cited in U.S. Appl. No. 14/216,765, 12 pgs.

U.S. Final Office Action dated Sep. 15, 2015 cited in U.S. Appl. No. 14/216,879, 11 pgs.

U.S. Non-Final Office Action dated Jan. 11, 2016 cited in U.S. Appl. No. 14/216,765, 19 pgs.

U.S. Non-Final Office Action dated Mar. 15, 2016 cited in U.S. Appl. No. 14/216,879, 5 pgs.

U.S. Non-Final Office Action dated Jan. 5, 2017 cited in U.S. Appl. No. 15/284,717, 12 pgs.

U.S. Non-Final Office Action dated Apr. 6, 2017 cited in U.S. Appl. No. 15/284,769, 12 pgs.

U.S. Non-Final Office Action dated Jun. 27, 2018 cited in U.S. Appl. No. 15/861,369, 11 pgs.

(56) References Cited

OTHER PUBLICATIONS

U.S. Final Office Action dated Mar. 7, 2019 cited in U.S. Appl. No. 15/861,369, 8 pgs.
U.S. Non-Final Office Action dated Feb. 28, 2020 cited in U.S. Appl. No. 16/720,081, 27 pgs.
European Extended Search Report dated Mar. 13, 2020 cited in Application No. 16918409.0, 5 pgs.
Related U.S. Appl. No. 18/499,865, filed Nov. 1, 2023, Inventor: Packouz.
U.S. Non-Final Office Action dated Oct. 24, 2023 cited in U.S. Appl. No. 17/307,695, 57 pgs.
European Extended Search Report dated Nov. 30, 2021 cited in Application No. 21171602.2, 12 pgs.
Chinese First Office Action dated Sep. 28, 2022 cited in Application No. 201680090567X (w/ English translation), 18 pgs.
Canadian Examiner's Requisition dated Dec. 15, 2022 cited in Application No. 3,039,257, 4 pgs.

* cited by examiner

TIME →

| | | | | | | | | | | | | | | | | |
|---|---|---|---|---|---|---|---|---|---|---|---|---|---|---|---|---|
| 85 | 86 | 87 | 88 | 89 | 90 | 90a | 90b | 90c | 90d | 91 | 91a | 91b | 92 | 93 | 94 | 95 |
| A | $F^{A}_{1}$ | A | $F^{A}_{2}$ | A | $F^{A}_{3}$ | A | $F^{A}_{1}$ | A | $F^{A}_{T}$ | B | $F^{B}_{1}$ | B | $F^{B}_{2}$ | B | $F^{B}_{T}$ | A |
| TAP | TAP | | TAP | | TAP | | TAP | | HOLD | RELEASE | TAP | | TAP | | HOLD | RELEASE |

2

A = Rhythm Loop First Type

B = Rhythm Loop Second Type $F^{X}_{Y}$ = Fill Sequence

X = Identifies which rhythm loop into which the fill is integrated

Y = Fill Type [# = Variation; T = Transition Fill]

FIG. 4

SYNTHESIZED PERCUSSION PEDAL AND LOOPING STATION

RELATED APPLICATIONS

The present application is a Continuation of U.S. application Ser. No. 16/989,748 filed Aug. 10, 2020, which issues on Mar. 23, 2021 as U.S. Pat. No. 10,957,296, which is a Continuation of U.S. application Ser. No. 16/712,193 filed Dec. 12, 2019, which issued on Aug. 11, 2020 as U.S. Pat. No. 10,741,154, which is a Continuation of U.S. application Ser. No. 15/861,369 filed on Jan. 3, 2018, which issued on Jan. 28, 2020 as U.S. Pat. No. 10,546,568, which is a Continuation of U.S. application Ser. No. 15/284,769 filed on Oct. 4, 2016, which issued on Feb. 27, 2018 as U.S. Pat. No. 9,905,210, which is a Continuation-In-Part of U.S. application Ser. No. 14/216,879 filed on Mar. 17, 2014, which issued on Nov. 15, 2016 as U.S. Pat. No. 9,495,947, which claims priority to U.S. Provisional Application No. 61/913,087 filed on Dec. 6, 2013, of which all are incorporated herein by reference in their entirety.

U.S. application Ser. No. 15/284,717 filed on Oct. 4, 2016, entitled "SYNTHESIZED PERCUSSION PEDAL AND DOCKING STATION," by Intelliterran, Inc., with commonly named inventor David Packouz, which issued on Feb. 13, 2018 as U.S. Pat. No. 9,892,720, the disclosure of which is incorporated by reference in its entirety.

FIELD OF DISCLOSURE

The present disclosure relates to music production, and more particularly, to foot operated synthesized percussion accompaniment pedals.

BACKGROUND

Musicians have used foot-operated pedals to add effects and other inputs for some time. Typically, one or multiple foot pedals are used to allow the musician the ability to have his hands free to play a primary instrument, such as a guitar, while retaining the ability to add complexity to the music through his foot's operation of the pedals. Foot-operated pedals may add various properties to the musician's tone by, for example, altering the resulting sound with effects like reverb or distortion.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An apparatus can include a midi-sequence module configured to store a plurality of main midi sequences, store a plurality of fill midi sequences, and playback a plurality of main midi sequences and the plurality of fill midi sequences. The apparatus can also include a first foot-operable switch configured to operate the midi-sequence module, an instrument input, and a looping means configured to record a plurality of signals received from the instrument input, generate a plurality of recorded loops associated with the plurality of recorded signals, store the plurality of recorded loops, and playback each of the plurality of recorded loops.

The apparatus can also include a second foot-operable switch configured to operate the looping means, where the first foot-operable switch is configured to receive a plurality of activation commands to operate the main midi-sequence module by way of at least one of the following functions playback a main midi sequence in response to a first activation command associated with the first foot-operable switch, playback a fill midi sequence associated with currently played main midi sequence in response to a second activation command associated with the first foot-operable switch, transition to another main midi sequence not currently being played in response to a third activation command associated with the first foot-operable switch, and stop the playback of the currently played midi sequence in response to a fourth activation command associated with the first foot-operable switch. In the apparatus, each of the plurality of activation commands are triggered based on a duration and frequency of a user application of the first foot-operated switch.

A system can include a drum-machine comprising a midi-sequence module configured to store a plurality of main midi sequences, store a plurality of fill midi sequences, and playback a plurality of main midi sequences and the plurality of fill midi sequences. The system can also include a first foot-operable switch configured to receive a plurality of activation commands to operate the main midi-sequence module by way of at least one of the following functions, playback a main midi sequence in response to a first activation command associated with the first foot-operable switch, playback a fill midi sequence associated with currently played main midi sequence in response to a second activation command associated with the first foot-operable switch, transition to another main midi sequence not currently being played in response to a third activation command associated with the first foot-operable switch, and stop the playback of the currently played midi sequence in response to a fourth activation command associated with the first foot-operable switch.

In the system, each of the plurality of activation commands are triggered based on a duration and frequency of a user application of the first foot-operated switch. The system also includes an instrument signal looper having an instrument input a looping means configured to record a plurality of signals received from the instrument input, generate a plurality of recorded loops associated with the plurality of recorded signals, store the plurality of recorded loops, and playback each of the plurality of recorded loops. The system may also include a second foot-operable switch configured to receive a plurality of activation commands to operate the looping means as follows commence a recordation of the signal received from the instrument input in response to a first activation command associated with the second foot-operable switch, stop the recordation of the signal received from the instrument input in response to a second activation command associated with the second foot-operable switch, initiate the playback of the recorded signal in response to a third command associated with the second foot-operable switch, and overdub the recordation the recorded signal in response to a fourth command associated with the second foot-operable switch. In the system, each of the plurality of activation commands are triggered based on a duration and frequency of a user application of the first foot-operated switch.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 4 is a chart demonstrating an example of how various rhythms may be played as a function of time;

DETAILED DESCRIPTION

Figure 1A:
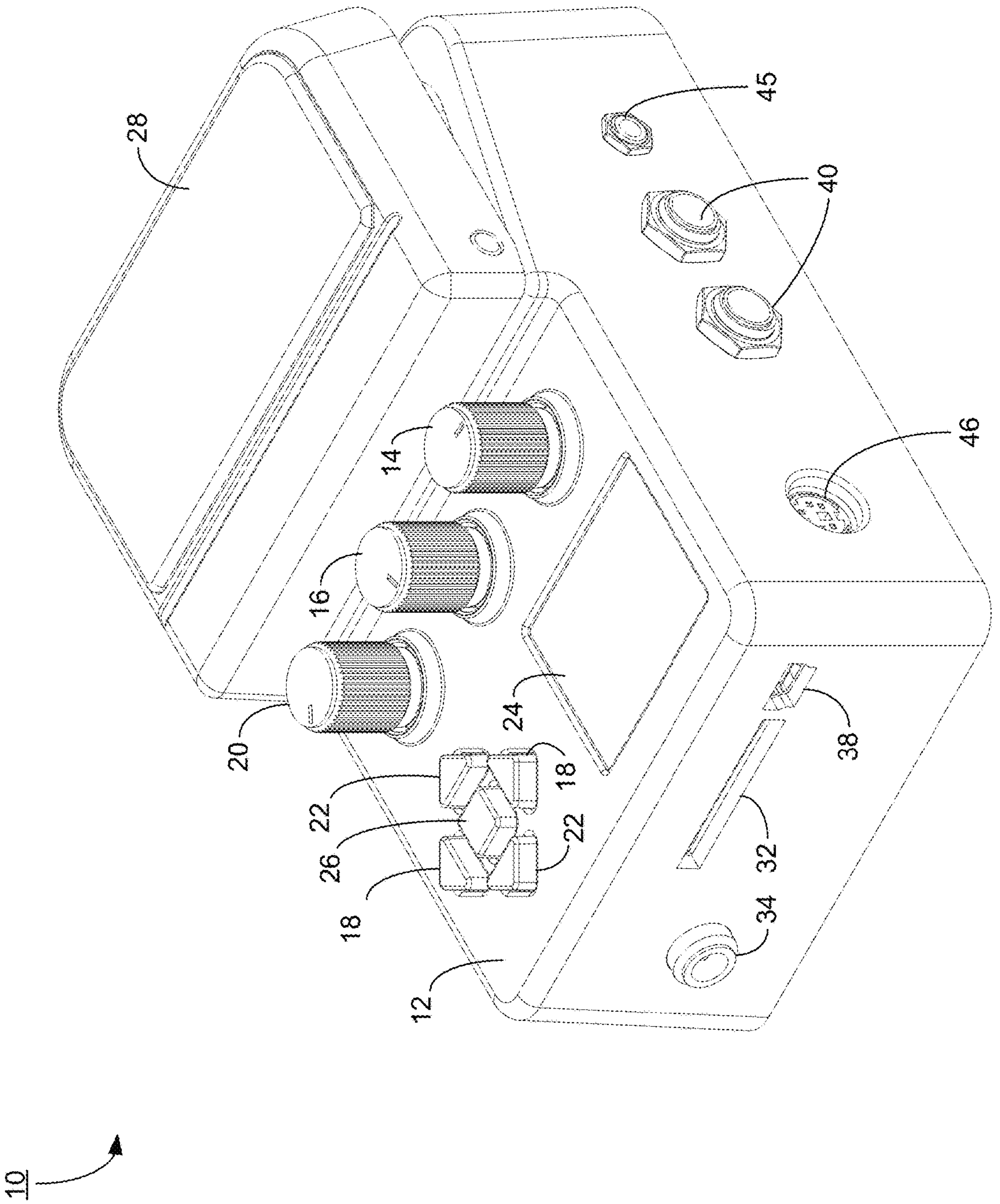
FIG. 1A illustrates a perspective view of an embodiment of an apparatus consistent with embodiments of the present disclosure.
Figure 1B:
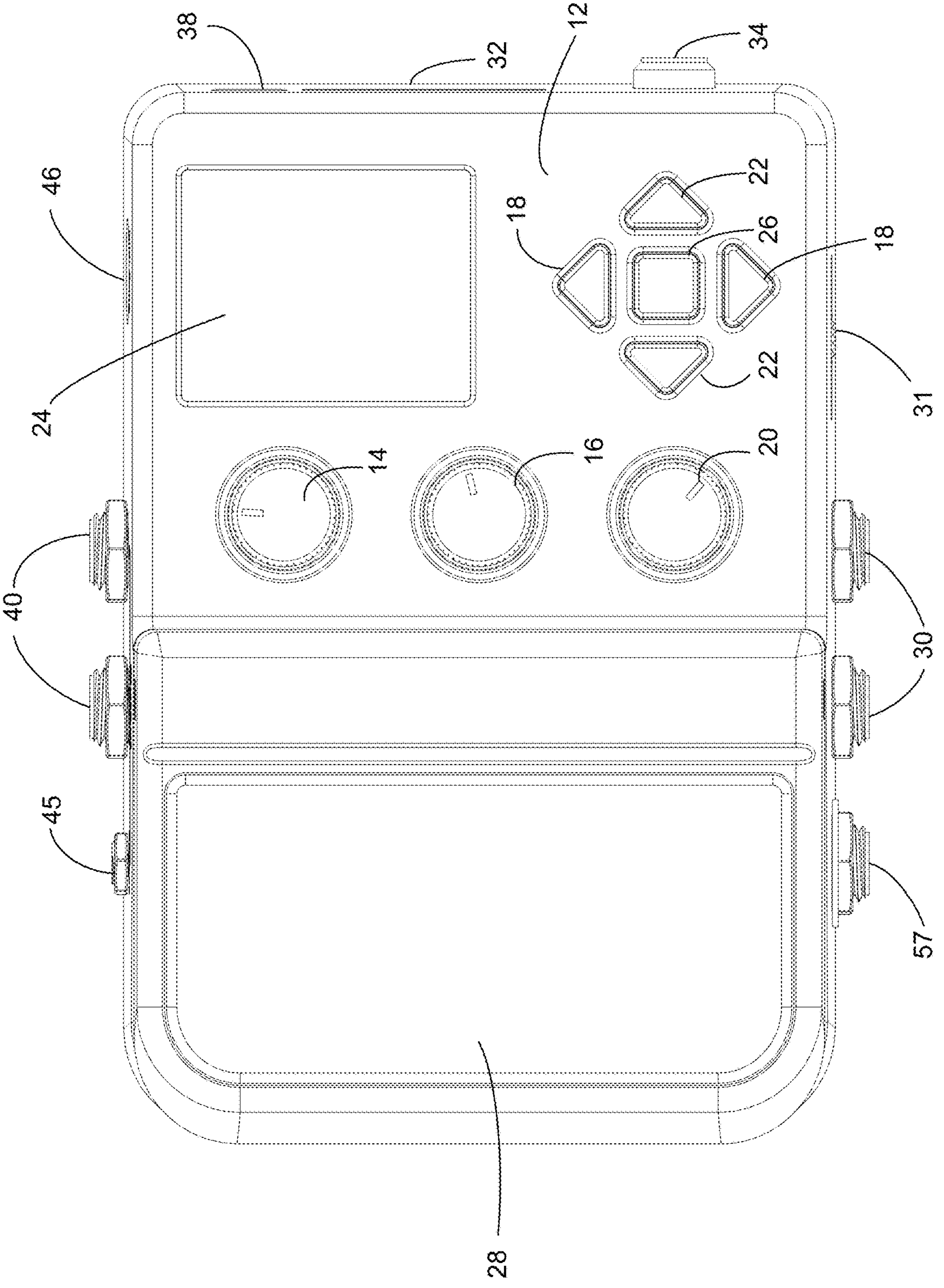
FIG. 1B illustrates a top view of an embodiment of an apparatus consistent with embodiments of the present disclosure.
Figure 1C:
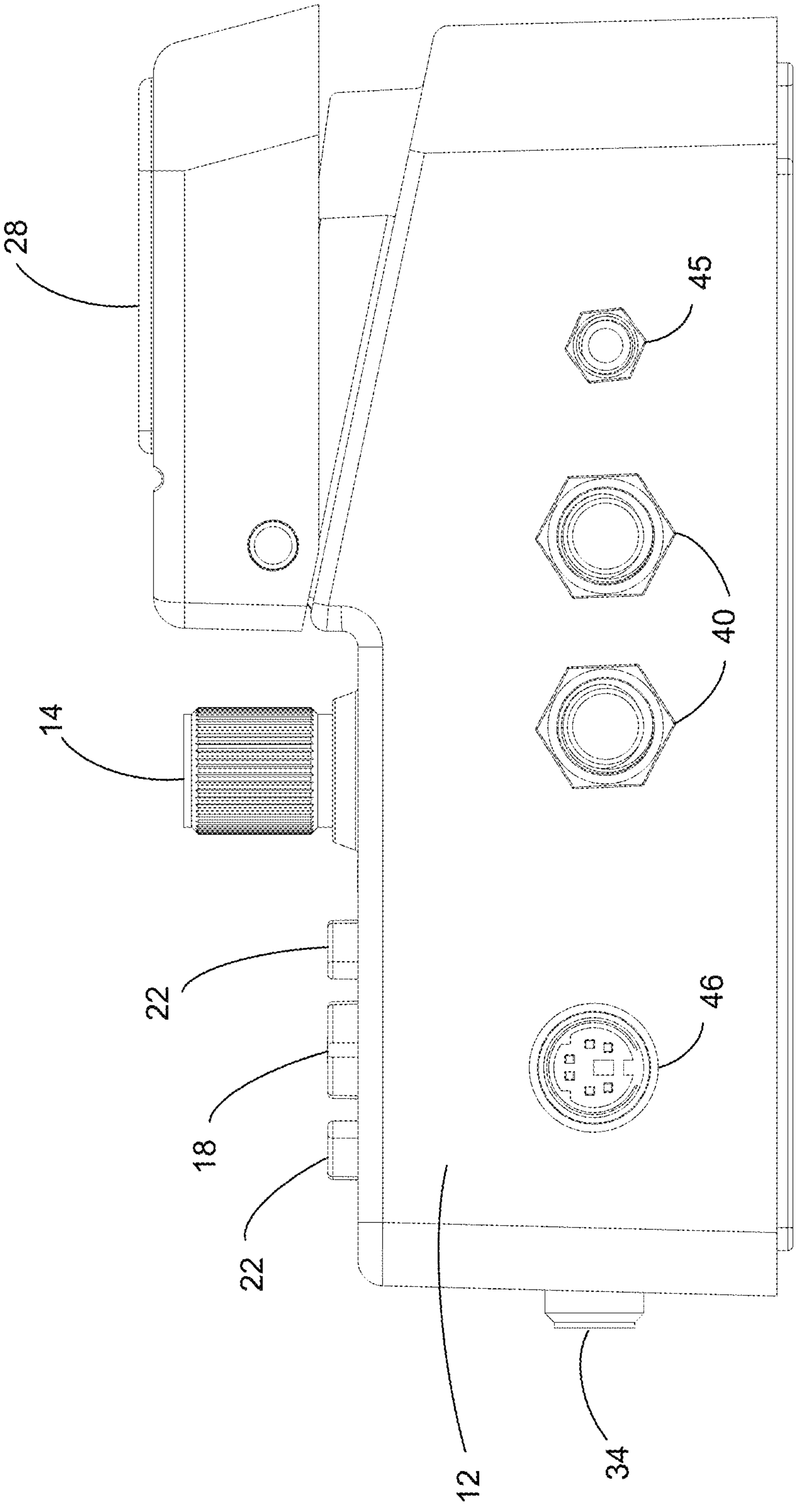
FIG. 1C illustrates a left-side view of an embodiment of an apparatus consistent with embodiments of the present disclosure.
Figure 1D:
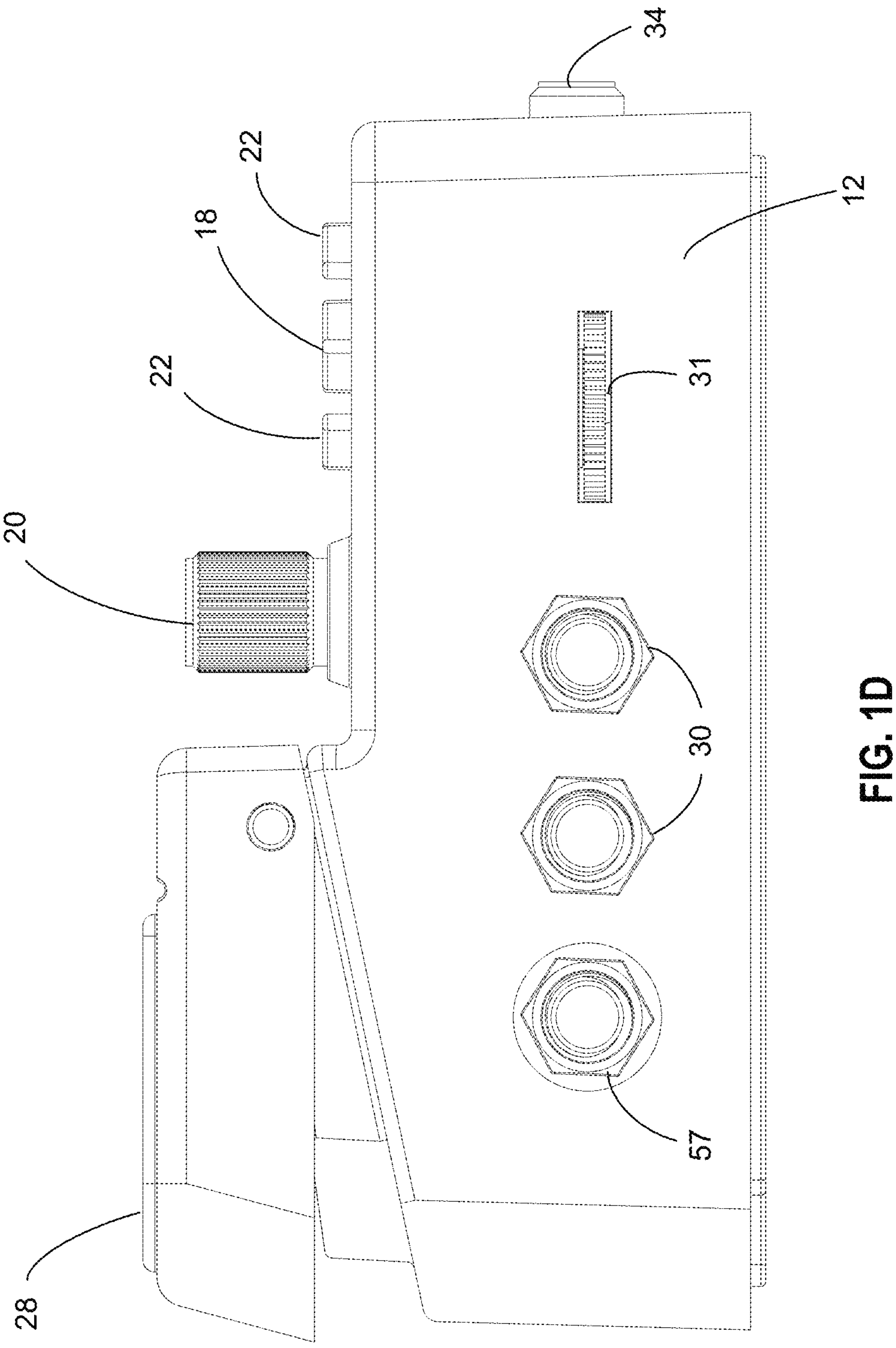
FIG. 1D illustrates a right-side view of an embodiment of an apparatus consistent with embodiments of the present disclosure.
Figure 1E:
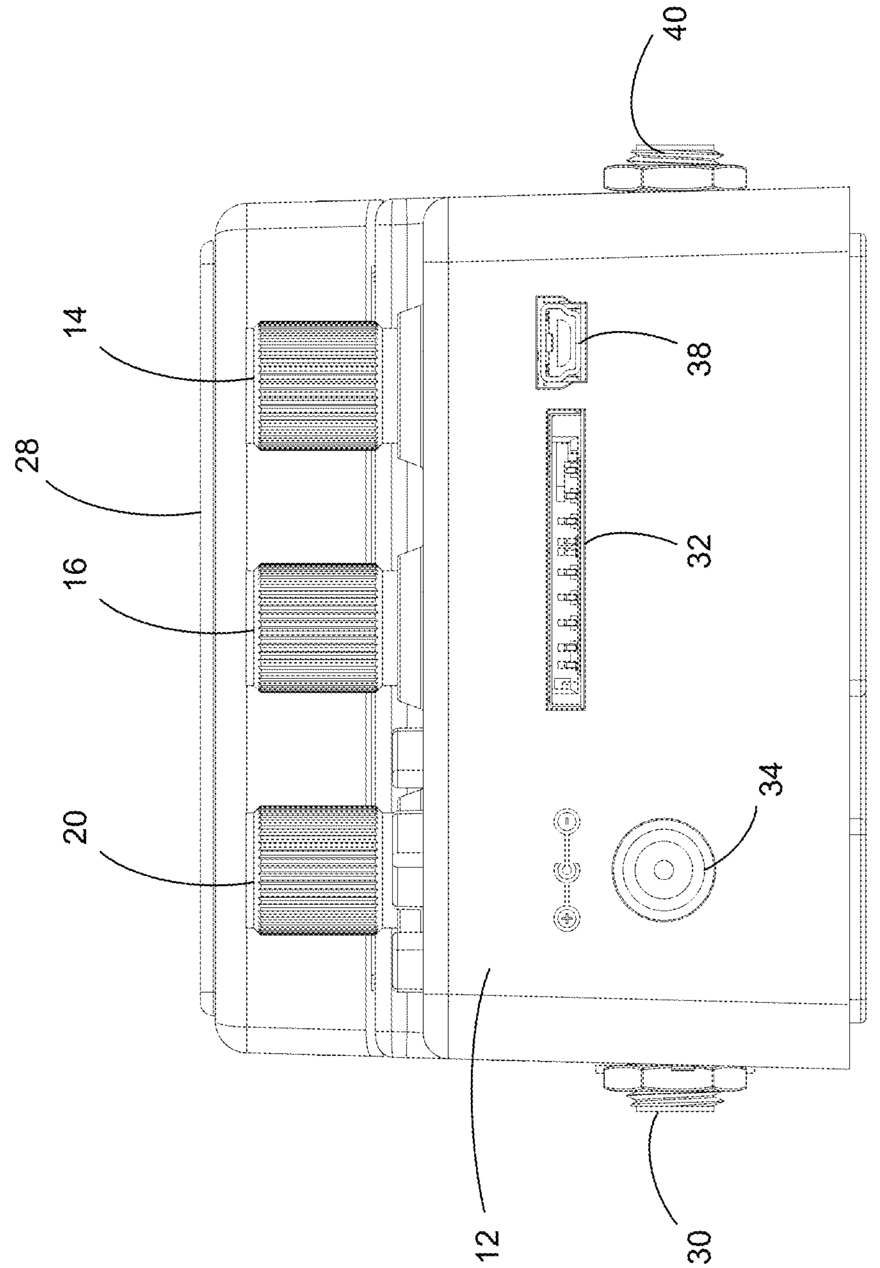
FIG. 1E illustrates a back view of an embodiment of an apparatus consistent with embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being “preferred” is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase “means for” or “step for” is actually used in such claim element, whereupon this statutory provision is intended to apply in the interpretation of such claim element.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of drumming midi capability, embodiments of the present disclosure are not limited to use only in this context. For instance, other file-types (e.g., WAV and MP3) as well as other instrument types are considered to be within the scope of the present disclosure.

I. Apparatus Overview

Embodiments of the present disclosure may provide an improved foot-operated signal processing apparatus. FIGS. 1A-1E and FIGS. 2-3 illustrate various embodiments. The apparatus may be in the form of a foot-operated pedal. FIGS. 1A-1E illustrate various embodiments of the foot-operated pedal, and will be discussed in greater detail below. The apparatus may be operative with, for example, computer programmable controls and switches that are customizable to perform various functions. For example, upon a user's operation of at least one of the controls and switches, the apparatus may be configured to, among other functions, interject various sequential midi fills or audio fills in a plurality of cyclic percussion rhythm sequences.

Figure 2:
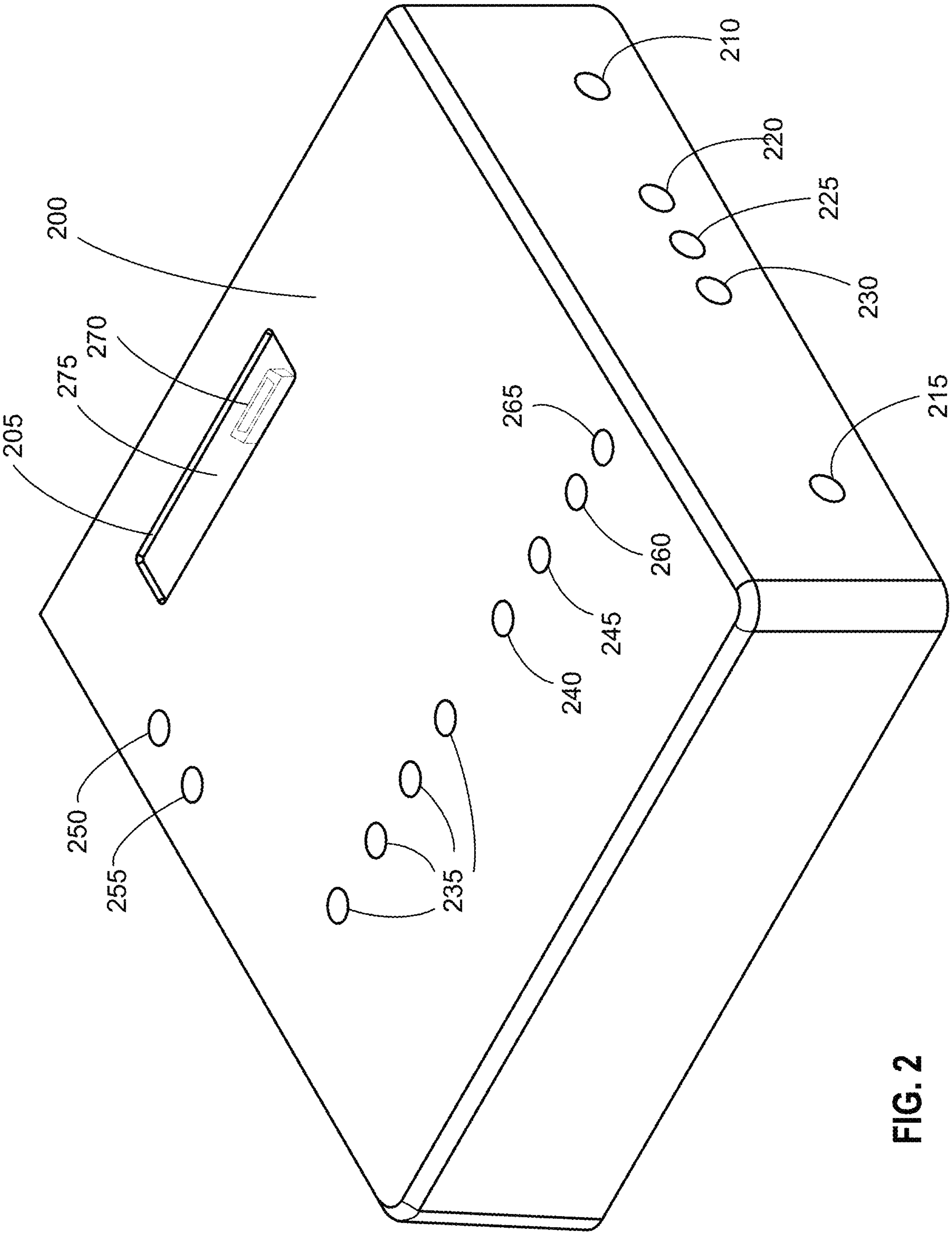
FIG. 2 is a diagram of another embodiment of an apparatus consistent with embodiments of the present disclosure.

Referring to FIG. 2, an apparatus consistent with embodiments of the present disclosure may consist of a casing 200. Casing 200 may be a metal casing that is adapted to be placed on, for example, the floor. Casing 200 may comprise multiple switches that the user may operate. The switches may comprise buttons that the user may press with his foot. A depression of the switches may enable the user to control the various functions and capabilities of the apparatus.

Figure 7:
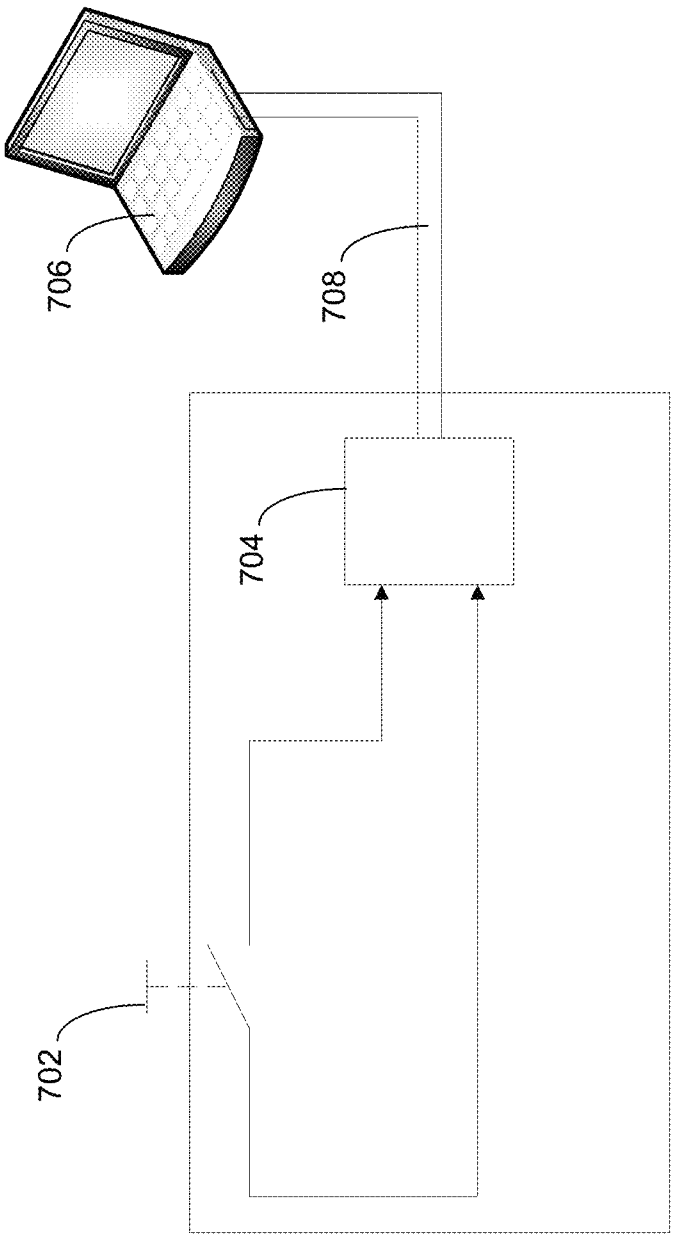
FIG. 7 illustrates a block diagram of an apparatus consistent with embodiments of the present disclosure.

According to some embodiments, an apparatus for facilitating control of midi sequence generation, as exemplarily illustrated in FIG. 7 is also provided. The apparatus may include a foot-operated switch 702. Further, the apparatus may include a switch port 704 configured to connected, through a wired and/or a wireless connection, to a mobile device 706 such as, for example, but not limited to, a laptop computer, a desktop computer, a smartphone, a tablet computer, a media player and so on.

Further, the foot-operated switch 702 may be electrically coupled to the switch port 704 in order to facilitate detection of a state of the foot-operated switch 702 by the mobile device 706.

In an instance, the foot-operated switch 702 may include an electric switch whose terminals may be connected to a pair of output terminals of the switch port 704. Accordingly, when the switch port 704 is coupled to the mobile device 706 through a cable 708, the mobile device 706 may be able to detect a state of the electric switch by applying an electric voltage across the terminals of the cable 708 and detecting presence of an electric current. Further, the electric switch may be so configured that the mobile device 706 may be able to detect one or more of an ON state, an OFF state, a duration of either ON state or OFF state, a sequence of ON and OFF states, a rate of ON and OFF states in a time period and so on.

In another instance, the apparatus may include an encoder to encode one or more states of the foot-operated switch 702 into a signal. Further, an output of the encoder may be coupled to the switch port 704. Accordingly, when a cable 708 is connected between the switch port 704 and the mobile device 706, the signal representing the one or more states of the foot-operated switch 702 may be transmitted to the mobile device 706.

In yet another instance, the switch port 704 may include a wireless transmitter such as, for example, a Bluetooth transmitter, coupled to the output of the encoder. Accordingly, when the mobile device 706 such as a smartphone is paired with the apparatus, the signal representing the one or more states of the foot-operated switch 702 may be transmitted to the mobile device 706.

Accordingly, in some embodiments, in order to operate the encoder and/or the transmitter, the apparatus may include a power source such as a battery. Alternatively, the apparatus may receive power through a power port included in the apparatus. Further, in other embodiments, the apparatus may receive power through the switch port 704 configured to be coupled to the mobile device 706.

Further, in some embodiments, the mobile device 706 may be configured to generate one or more midi sequences based on the one or more states of the foot-operated switch 702. Accordingly, the mobile device may include a mini-sequence module configured to generate midi-sequences. For instance, the mobile device may be a laptop computer including a processor and memory containing a sound synthesis software. Further, the sound synthesis software may be executable on the processor in order to generate the one or more midi-sequences based on the one or more states of the foot-operated switch 702. Further, the mobile device may include an output port (not shown in the figure) configured to be electrically connected with a sound processing device, such as for example, a sound reproducing device. Accordingly, the one or more midi sequences generated may be converted into sounds. Alternatively, the output port may be electrical coupled to a mixer circuit which may also receive other electronic signals corresponding to such as, for example, vocals and/or instrument sounds.

Further, in some embodiments, the midi-sequence generated by the mobile device 706 may be provided to the apparatus. Accordingly, the apparatus may further include a midi input port configured to be connectable to the mobile device 706. Furthermore, the midi-sequence generated by the mobile device 706 may be receivable through the midi input port. For instance, the switch port 702 may include the midi input port. Accordingly, when the mobile device 706 is connected to the apparatus through, for example, cable 708, the midi sequence generated by the mobile device 706 may be available at the midi input port.

Furthermore, in some instances, the apparatus may include an instrument input port configured to receive an electronic signal from a musical instrument. Additionally, the apparatus may include a mixer for mixing each of the electronic signal from the musical instrument and the midi-sequence. Accordingly, a mixed signal may be generated at an output of the mixer, which may be, for example, provided to a sound reproduction device.

The signal received from the musical instrument can be processed with various digital signal processing techniques. For instance, a built-in tuning module may indicate when a signal coming from a guitar is out-of-tune. The built-in tuning module may indicate via a display the offset of the frequency from the nearest in-tune frequency for a particular guitar tuning. The particular tuning that serves as the baseline for the tuning module may be specified by the user. Other signal processing techniques, such as effects that may be added with conventional guitar pedals are possible to integrate with the apparatus of the present disclosure. Additional footswitches, knobs, and controls may be implemented within the apparatus to enable a user to operate the additional signal processing.

Still consistent with embodiments of the disclosure, the received signal may be processed by a beat detection module. The beat detection module may be configured to derive various aspects of the received signal including, but not limited to, for example, the tempo and rhythm played by the musical instrument. In turn, the beat detection module can adapt a beat that matches the tempo and rhythm played by the musical instrument. In this way, the user may just need to indicate, for example, by operating the apparatus, when the apparatus should activate the beat adapted by the beat detection module. The various beat control features disclosed herein would be operable in conjunction with the adapted beat just as they would be applicable to a pre-programmed beat.

Still consistent with various embodiments, the apparatus may further comprise a docking station 205 as illustrated in FIG. 2. Docking station 205 may be configured to enable a mobile computing device to be docked and adapted to the apparatus. In turn, the docking of the mobile computing device may expand the operational and functional capacity of the apparatus.

For example, docking station 205 may enable a user of the apparatus to dock his smartphone, tablet computer or other similar mobile device (collectively referred to herein as "mobile device") to the apparatus. The mobile device may be configured with software to enable operative communication between the mobile device and the apparatus. Once docketed, the mobile device may be used to display of information associated with the operation of the apparatus. Moreover, the mobile device may be further enabled to act as a control panel to adjust various settings and parameters of the apparatus. Docking station 205 may also enable a user to dock an external LCD screen to create a more easily visible display of the contents of display 24.

Accordingly, in some embodiments, as exemplarily illustrated in FIG. 2, the docking station may include a USB docking station 205. One functionality offered by the USB docking station 205 may be to enable docking of mobile devices equipped with one or more serial ports, such as, for example, but not limited to, USB 1.x, USB 2.x, USB 3.x, USB Type-A, Type-B, Type-C, mini-USB and micro-USB. Accordingly, the USB docking station 205 may include one or more of USB connectors 270 which may be a female connector and/or a male connector depending on a corresponding one or more USB connectors included in the mobile device. For example, generally the mobile devices, such as a smartphone, may include a female USB connector disposed on an edge of the mobile device. Accordingly, the USB docking station 205 may include a male USB connector 270 configured to mate with the female USB connector of the mobile device. It should be understood that, although USB is referenced throughout the specification, any connector type capable of communicating data between the connected devices may be used. As such, terms used herein like USB connector or USB docking station and the like, are not meant to be restrictive but only illustrative of an example connection between devices.

Further, in some embodiments, the one or more USB connectors 270 may be disposed on one or more locations on the apparatus. For example, as illustrated, the apparatus may include a slot 275 configured to receive a portion of the mobile device. Accordingly, the one or more USB connectors 270 may be disposed at a bottom portion of the slot 275 such that when the mobile device is placed within the slot 275, the USB connector 270 of the docking station 205 may mate with the USB connector included in the mobile device. Accordingly, in some embodiments, the placement of the one or more USB connectors 270 may be configured to be compatible with one or more designated models of the mobile device. For example, different models of the mobile device belonging to a manufacturer may be characterized by a predetermined position of the USB connector included in the mobile device. For instance, in most cases the USB connector included in the mobile device is situated at a top edge or a bottom edge of the mobile device. Further, the USB connector included in the mobile device may be situated at a predetermined distance from a corner of the mobile device. Accordingly, the USB connector 270 may be configured to be situated at a position so as to facilitate proper mating with the USB connector included in the mobile device when the mobile device is docked into the USB docking station 205.

Further, in some embodiments, the USB connector 270 may be movable. Accordingly, a position of the USB connector 270 in relation to the slot 275 of the USB docking station may be moved either manually and/or automatically using a motor. The movability of the USB connector 270 may facilitate docking of the mobile device independent of a model/manufacturer of the mobile device. For instance, the USB connector 270 may be movably attached to a rail running along the length of the slot 275. Further, in some instances, the USB connector may also be attached to a rail running along the width of the slot 275. Further, the USB connector 270 may be electrically coupled to the rail which may in turn be coupled to the electrical circuitry included in the apparatus. Accordingly, a user may manually move the USB connector 270 over the rail at a position to match the position of the USB connector included in the mobile device. As a result, the mobile device may be successfully, docked to the USB docking station.

Alternatively, in some embodiments, the apparatus may be configured to automatically detect the manufacturer/make of the mobile device through wireless communication with the mobile device (e.g., through Bluetooth or NFC). For example, the mobile device may transmit an identifier such as, IMEI number, which may be used to determine the model of the mobile device. Subsequently, the apparatus may determine a position of the USB connector included in the mobile device in relation to the body of the mobile device by querying a database of mobile device specifications. Accordingly, the apparatus may be configured to automatically activate, for example, a linear motor coupled to the USB connector 270 in order to bring the USB connector 270 at a position suitable for mating with the USB connector included in the mobile device.

Further, in some embodiments, the slot 275 included in the apparatus may also be physically alterable in dimensions. For instance, one or more dimensions such as, a width, a length and a depth of the slot 275 may be alterable by means by motors (not shown in figure). For instance, each wall of the slot 275 may be placed on a rail and coupled to a linear motor. Accordingly, each wall of the slot 275 may be movable back and forth and held at a position according to provide a slot 275 with required dimensions. Additionally, the apparatus may be configured to alter the dimensions of the slot 275 in accordance with dimensions of the mobile device. For instance, as the mobile device is brought in proximity to the apparatus, the apparatus may establish a wireless connection with the mobile device in order to receive an identifier from the mobile device. The identifier, such as, for example a hardware identifier, may facilitate the apparatus to determine the manufacturer and/or model of the mobile device. Further, based on the identifier, the apparatus may determine dimensions of the mobile device by querying a database of mobile device specifications. Accordingly, the apparatus may be configured to actuate the linear motors coupled to the walls of the slot 275 in order to alter dimensions of the slot 275 to accommodate the mobile device. As a result, a wide variety of mobile devices may be docked to the USB docking station 205.

Still consistent with embodiments of the present disclosure, the mobile device may be configured to serve as the core digital processing center of the apparatus. Because many users already own mobile devices, integrating their mobile device as the processing core and display for the apparatus may reduce the manufacturing cost of the apparatus, as the performance of many functions may be handed off to the mobile device.

In various embodiments, the apparatus may comprise a wireless communications unit such as, for example, but not limited to, a Bluetooth or Wi-Fi compatible communications module. With a wireless communications unit, the apparatus may be enabled to communicate wirelessly with the mobile device. In this way, the mobile device may not need to be physically docked to the apparatus, thereby improving the convenience of the mobile device's cooperation with the apparatus as the user may simply place the mobile device within wireless communication range to the apparatus.

The apparatus may further comprise a power port 210 as an input power source, an instrument input port 215 as a signal input source, adapted to receive a signal from a musical instrument, and an output port 220 where a processed signal may be delivered (e.g., a signal generated by the apparatus, in addition to or in place of, the musical instrument's originally produced signal).

Controls on the apparatus and/or the software of a connected mobile device, may enable a user to adjust various parameters of the output signal. For example, the user may be enabled to adjust the volume balance between the generated sound of the apparatus and the originally produced signal of the instrument. Moreover, the apparatus may comprise an instrument only output 225 that only sends the instrument signal, thereby only delivering the signal generated by the instrument. In this way, the processed signal (e.g., midi-percussion generator signal) and the music generated by the instrument may be routed to separate channels. This may be advantageous in scenarios where the user would like to have different signals go to different speakers, as percussion and instrument music have different sonic characteristics and benefit from different sonic processing and speaker systems. Still consistent with embodiments of the present disclosure, the apparatus may comprise yet another output 230 for delivering a generated signal alone, without the instrument signal.

Still consistent with embodiments of the present disclosure, the apparatus may comprise a plurality of sequence switches 235. Each of the percussion sequence switches may be configured to trigger a midi or audio file (e.g., a percussion loop) that is associated with the switch. The sequence may be looped continuously until the user triggers another switch. The signal generated by the switch may be outputted through ports 225 and/or 230. In this way, a user may be enabled to initiate any of the pre-configured midi or audio sequences (e.g., percussion loops) in any order he chooses, rather than being forced into a predetermined order. Consistent with embodiments of the present disclosure, a user may use a connected mobile device and its corresponding software to configure which sequence switches should be associated with which midi-sequences, fills, accents, and various other parameters.

A single tap of the percussion switch may initiate a midi-sequence loop. In some embodiments, midi-sequence loops may be associated with various fills such as, for example, intro fills, break fills, transition fills, and ending fills. A fill switch 240, upon activation, may be enabled to trigger the playing of a fill associated with the midi-sequence. Different variables may control whether or not a midi-sequence's associated fill is played. For example, an intro fill may only be played if the midi-sequence is the first loop to be played, simulating a drummer starting to drum to a song with an intro loop. Alternatively, individual switches may be programmed to trigger individual types of fills, such as, but not limited to, for example, an intro fill, ending fill, or different styles of fills such as decreasing or increasing in intensity.

A single tap of a different percussion sequence switch may start the main midi-sequence loop associated with the activated switch. However, the sequence loop may be commenced at the end of the corresponding musical bar to keep the musical timing correct. Still consistent with embodiments of the present disclosure, if the user holds down a switch 235, a transition fill may be played in a loop until the switch is released and then the apparatus may transition to the main midi-sequence loop associated with that switch. This allows the user to decide whether or not he wishes to have a transition fill or not when changing main midi-sequence loops. The initiated transition fills can further be customized to depend on which main midi-sequence loops are being switched between, to have a more natural and realistic transition between different types of beats. Consistent with embodiments of the present disclosure, a user may use a connected mobile device and its corresponding software to configure which sequence switches should be associated with which transition fills, as well as various other parameters. In some embodiments, separate dedicated switches may be used to end with either an ending fill or immediately with a single tap for ease of use. Additional switches may be used to insert accent hits, such as cymbal crashes or hand claps, or to pause and un-pause the beat to create rhythmic drum breaks.

Each main midi-sequence loop may have its own set of fills associated with it, which may be triggered by pressing fill switch 240. Fill switch 240 may be configured to enable a single tap on any of sequence switches 235 to initiate the transition between main midi-sequence loops without a transition fill. A double tap on any of sequence switches 235 may cause the midi-sequence playback to stop with an ending fill, if present, or at the end of the bar, if the ending fill is not present. A triple tap on any of sequence switches 235 may cause the midi-sequence playback to stop without an ending fill. In some embodiments of the present disclosure, a rate of the double and triple tap commands to end the midi-sequence may be configured to correspond to a rate of the song's tempo, such that a user may double tap or triple tap to the tempo to the end of the song without getting confused by being forced to tap to at any other tempo. In some embodiments, the main pedal may be held down to affect a transition fill between song parts, without separately selecting a fill switch.

In some embodiments, as will be greater detailed with reference to FIGS. 1A-1E, the apparatus may comprise a single pedal acting as a foot-operated switch. The switch may, as with the midi-sequence switches 235, be tapped to initiate the playing of a midi-sequence, transition to a pre-programmed subsequent midi-sequence, or, among other functions that will be detailed below, end the playback of a midi-sequence. In these embodiments, three quick taps of pedal 28 may be operative to deactivate the midi-sequence currently played by the apparatus.

Still consistent with embodiments of the present disclosure, the apparatus may further comprise an accent hit switch 245 which can be associated with different sounds (e.g., midi or audio) to trigger 'one-off' sounds such as, for example, a hand clap or cymbal crash which may or may not be associated with the main midi-sequence loop. The bank up 250 and bank down 255 switches may be configured to change the main midi-sequence loops, and consequently their associated fills to allow the user to have the capability of choosing among many more main midi-sequence loops. Consistent with embodiments of the present disclosure, a user may use a connected mobile device and its corresponding software to configure and store a plurality of midi-sequences and which sequence switches should be associated with the sequences for each bank.

Consistent with embodiments of the present disclosure, the apparatus may further comprise a looper switch 260. Looper switch 260 may be configured to record a loop of a signal received in the input port of the device. The recorded loop may be synced (or quantized) with a tempo or a MIDI-sequence selected on the device. In this way, the loop may always be recorded in-time with a particular tempo and/or MIDI-sequence.

A single press of looper switch 260 may signal the apparatus to start recording the signal received from the instrument input. The signal from the instrument input may be any signal, not just a clean musical instrument input. A subsequent press of looper switch 260 may stop the recording and initiate playback. A third press of the looper switch 260 may start an overdub, recording over the originally recorded loop.

A quick double tap of the looper switch 260 stops the recorded loop and optionally, the percussion as well. A user may determine the rate and functionality of the double tap of the looper switch 260 through a user interface associated with the apparatus. A user may also optionally set the loop playback to end when the percussion loop is changed to allow the music of the instrument to be changed as the user moves to a different section of a song. In yet further embodiments, the apparatus may automatically initiate recording of a new loop of the signal received from the instrument as the new percussion loop begins to allow the user to seamlessly and easily begin recording a new looped musical sequence in the new section of the song. Further still, in various embodiments, the apparatus may comprise an additional switch 265 which, when activated, may allow the user to toggle between the options of having the instrument recorded loop end at a percussion loop change and whether or not, for example, to start recording a new instrument loop with the new percussion loop. Embodiments of the present disclosure may enable the syncing of the recorded looped instrument sound with the generated midi-sequence so that the instrument loop starts and ends exactly on the beat of the midi-sequence loop. In this way, the apparatus may prevent the instrument recorded loop playback from going out of sync with the midi-sequence loop.

In accordance with some embodiments, the apparatus may be configured to enable a user to trigger a midi-sequence from a plurality of midi-sequences as per the user's need. Accordingly, the apparatus may include one or more foot-operated switches configured to operate the midi-sequence module. Further, the one or more foot-operated switches may be configured to non-sequentially trigger one or more main midi-sequences from a plurality of main midi-sequences.

In other words, a user may be enabled to activate the one or more foot-operated switches to trigger the plurality of main midi-sequences in any arbitrary order as per the user's need. For example, consider a scenario where the midi-sequence module is configured to generate a plurality of main midi-sequences numbered 1, 2 and 3. Accordingly, in one instance, the one or more foot-operated switches may enable the user to trigger main midi-sequence 1, followed by main midi-sequence 3 without necessarily triggering main midi-sequence 2 in between. Similarly, in another instance, the user may be able to trigger main midi-sequence 3 followed by main midi-sequence 2 and then again trigger main midi-sequence 3.

Figure 8:
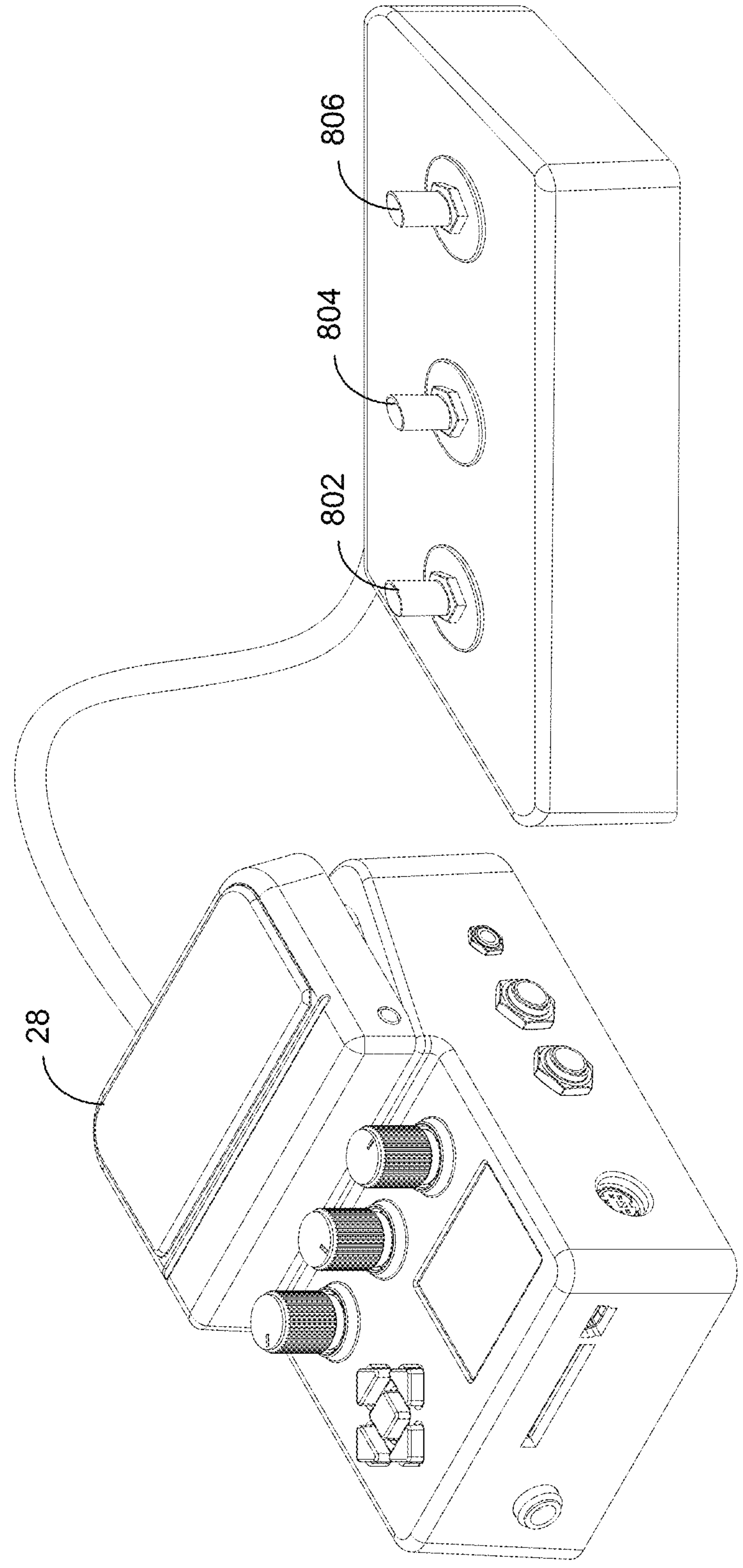
FIG. 8 illustrates a perspective view of an apparatus consistent with embodiments of the present disclosure.

For instance, in some embodiments, the one or more foot-operated switches may include a primary foot-operated switch 28, such as for example, as illustrated in FIG. 8. Further, the primary foot-operated switch 28 may be configured to non-sequentially trigger the one or more main midi-sequence. Furthermore, each main midi-sequence may be triggered by a corresponding predetermined number of activations of the primary foot-operated switch 28. Additionally, consecutive activations of the primary foot operated switch 28 are separated by at most a predetermined time duration, such as, for example, but not limited to, 0.3 seconds.

Additionally, in some embodiments, each main midi-sequence may be associated with a non-zero natural number such as 1, 2, 3 and so on. Further, performing a number of activations of the primary foot-operated switch 28 may trigger a main midi-sequence corresponding to the number. For example, consider a scenario where the midi sequence module is configured to generate five different main midi-sequences. Accordingly, the main midi-sequences may be associated with the numbers 1, 2, 3, 4 and 5. Consequently, in order to trigger, for instance, the main midi-sequence numbered 3, the user may perform three activations the foot-operated switch 28 in rapid succession. Similarly, while the main midi-sequence numbered 3 is being played, the user may perform a single activation of the foot-operated switch 28 and cause the main midi-sequence numbered 1 to be triggered.

Further, in some embodiments, the one or more foot-operated switches may include a primary foot-operated switch 28 and a plurality of secondary foot-operated switches, such as 802, 804 and 806 as exemplarily illustrated in FIG. 8. Further, each secondary foot-operated switch may be associated with a main midi-sequence. For example, the plurality of secondary foot-operated switches 802, 804 and 806 may be associated with main midi-sequence numbered 1, 2 and 3 respectively. Accordingly, the user may activate, for example, the foot operated switch 802 to trigger main midi-sequence 1 and followed by activating the foot operated switch 806 to trigger main midi-sequence 3.

In some embodiments, the one or more foot-operated switches may include a first set of switches, which when activated, may be configured to trigger a corresponding main midi-sequence. Further, the one or more foot-operated switches may include a second switch, which when activated, may be configured to trigger a fill-in midi-sequence to be interjected into a main midi-sequence. Furthermore, the one or more foot-operated switches may include a third switch, which when activated, may be configured to insert an accent sound including one or more of a midi file and an audio file. Additionally, the one or more foot-operated switches may include a fourth switch enabled to record loops associated with the signal received from the musical instrument. Further, the apparatus may be configured to sync the loops recorded by an activation of the fourth switch with a timing of a main midi-sequence.

It should be understood that the aforementioned disclosure may be compatible with synthesized or recorded percussion tones used with midi-sequences. In this way, the apparatus may serve as a percussion section accompaniment to a musician. Furthermore, it should be understood that the various functions disclosed herein may be performed by either a processing unit or memory storage built-in with the apparatus, or associated with a docked or otherwise connected mobile device operating in conjunction with the apparatus. The customizations and configurations may be set with software accompanying the processing unit and memory storage of either the apparatus or the mobile device. Reference to the processing unit, memory storage, and accompanying software is made with respect to FIG. 6 below.

II. Device Design

Figure 3:
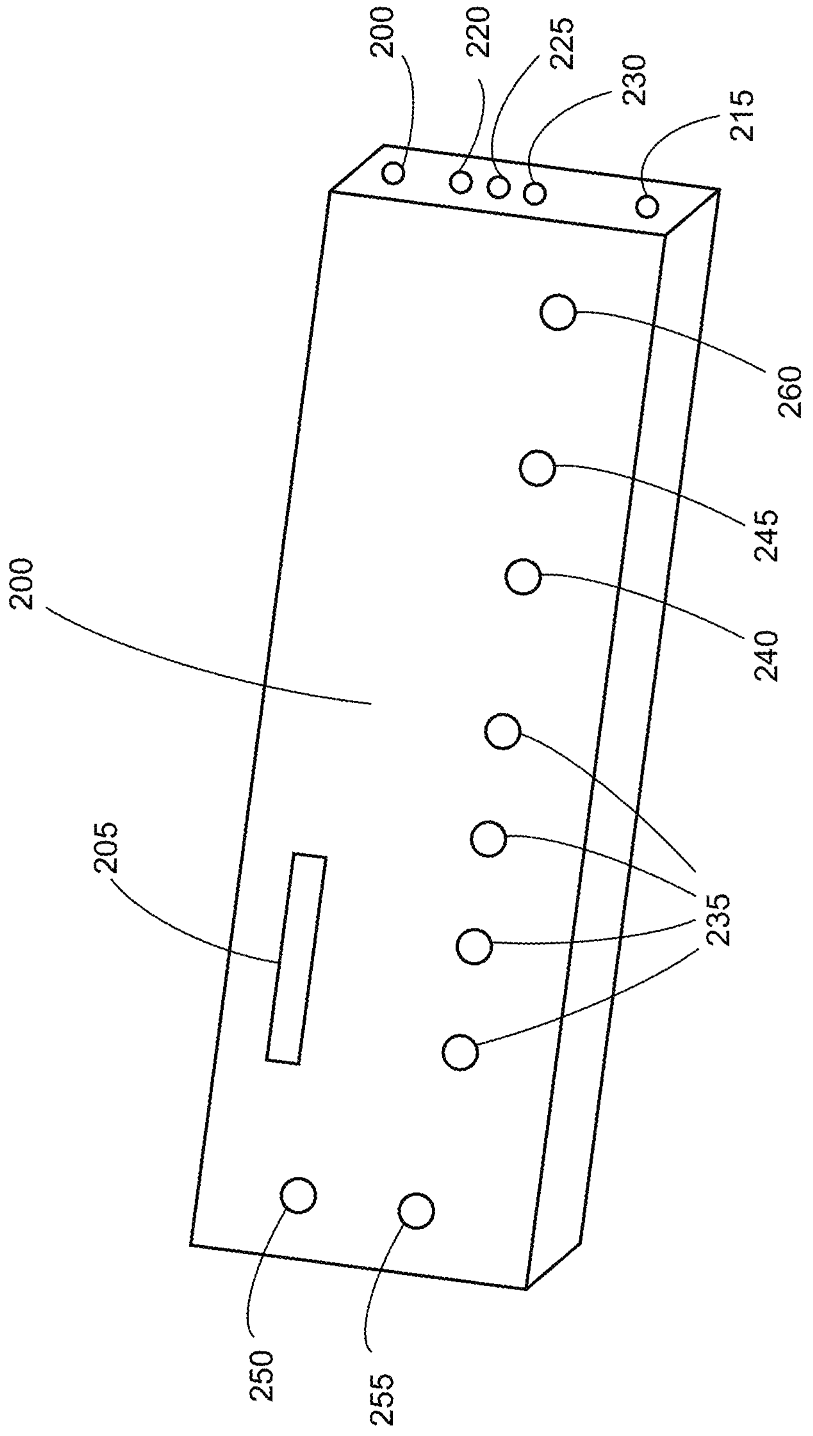
FIG. 3 is a diagram of yet another embodiment of an apparatus consistent with embodiments of the present disclosure.

The apparatus may take the form of a plurality of different designs, such as those shown in FIGS. 1-3. Referring back to FIGS. 1A-1E of the drawings, an embodiment of a device 10 consistent with embodiments of the present disclosure may comprise a case 12, a selector 14, a selector 16, one or more selectors 18, a selector 20, one or more selectors 22, a display 24, a sensor 26, a pedal 28, inputs 30, a card slot 32, a port 34, a port 38, outputs 40 and 45, phones volume 31, foot switch 57, and a midi sync 46. Consistent with embodiments of the present disclosure, the selectors may be programmed by the user using software associated with device 10 (also referred to as the 'apparatus' throughout the present disclosure).

Generally, embodiments of the present disclosure comprise a MIDI (musical instrument digital interface) sound generator housed in a case 12 constructed of a rigid and durable material such as metal or a high impact polymer to survive significant abuse, wear and tear.

A plurality of controls are located on the upper face of the case 12 so that they are viewable when standing above the pedal. One possible configuration of the controls is shown in FIGS. 1A-1E, comprising of a volume selector 14, a drum set selector 16, a selector 18, a tempo selector 20 and a selector 22.

An internal memory storage means, such as solid state memory, flash memory, hard-drive or other memory device is fixed inside the case 12, and will be detailed with reference to FIG. 5. The memory storage means may hold a pre-selected set of MIDI or audio rhythms. Each set of associated MIDI rhythms may be designated by a name that may correspond to a song the user wishes to play. The songs may be organized in folders for easy categorization and access.

In various embodiments, the apparatus may optionally display loop numbers. Loop numbers may correspond to the style selector. In various embodiments, for each style (e.g., rock, jazz, etc.) there may be an unlimited quantity of loop sequences (or 'songs'). Various parameters and settings of the apparatus, such as, for example, but not limited to, the loop number, rhythm style, and the like, may be displayed on display 24 for easy reference and navigation through the various available loops.

In the device's most simple use, the MIDI sequence is repetitively looped. In other words, the full MIDI file may be played, and when completed, may immediately start over from the beginning to repeat the cycle.

Selector 18, when pressed, may enable the user to move between a folders display (i.e., where songs may be categorized). Selector 22, when pressed, may enable the user to scroll up and down to, for example, select a folder or song. In various embodiments, an external footswitch may serve as a selector button to enabling the scrolling between songs or folders.

Consistent with embodiments of the present disclosure, the MIDI sequence may be initiated by a brief tap with the foot onto the pedal 28. The device may then execute the MIDI file and send an analog audio signal out through the outputs 40. Typically, the signal may then be transmitted to an external amplifier where it is broadcast to the audience. In some embodiments, the outputs may be fed into (or "daisy chained") another external device that may manipulate or otherwise interact with the signal as produced by the device.

Still consistent with embodiments of the present disclosure, the MIDI sequence may be outputted and provided to another computing device. For example, the MIDI sequence may be streamed to a computer which, in turn, may playback sound based on the MIDI sequence instructions. In this way, both the memory and processing limitations of an otherwise stand-alone apparatus may be overcome by adding external capabilities.

In some embodiments, the MIDI-sequence triggered may be inputted to the apparatus and played back by the apparatus as though the MIDI-sequence was generated by the apparatus itself. In this way, a user is enabled to input a plurality of MIDI-sequences and operate the apparatus to control the MIDI-sequences in the methods described herein. In yet further embodiments, MIDI-sequences may be uploaded to a memory storage of the apparatus.

The internal storage means may store dozens or hundreds or thousands of unique groups of associated MIDI files or 'songs', each representing a distinct percussion sequence. The selector 22 may be utilized to move between the various songs. In some embodiments, the memory storage of a docked or otherwise connected mobile device may be used to store MIDI files that would, in turn, be played by the apparatus.

The drum set selector 16 may apply any of a predetermined set of MIDI instrument voices onto the percussion loop played. Typically, the drum set selector 16 may be set to a specific instrument voice for the duration of a musical piece, score or other meaningful distinction point. Standard drum set instrument voices may include, for example, but not be limited to, pop, jazz, rock or other classification of voice. In the example shown in FIGS. 1A-1E, the drum set selector 16 takes the form of a dial that rotates to select from the stored drum sets in the device as displayed on the device's screen.

The volume selector 14 may be used to set the line level of the outputs 40. This allows for a simple and customizable output level for the device. Other third party pedals up line in a daisy chain of pedals may also be affected by the volume selector 14. Typically, the volume selector is used to affect the prominence of the percussion sound generated by the device relative to the instrument sounds that pass unmodified through the device. In some embodiments of the device, the volume of the instrument signal may not be affected by the device and may otherwise be unaffected. The overall volume of the sounds generated by the apparatus may be generally controlled at the main amplifier level, external to the apparatus. In the example shown in FIG. 1, the volume selector 14 takes the form of a dial that rotates to any infinitely variable position. The volume selector 14, in some embodiments, may only affect the volume of the midi-sequences produced by the device.

The style selector 18 adds a further component to the output by the device. Typical styles may include, for example, jazz, blues, pop, rock or other styles pre-selected by the user. These styles may be preselected by the user through a user-interface of a software associated with the apparatus which may, in some embodiments, be provided by a docked or otherwise connected mobile device. As with the drum set selector 16, the style may be often left unchanged for a musical piece or longer.

The tempo BPM (beats per minute) selector 20 may comprise one possible means to adjust the rate or tempo of the beat produced by the device. Generally, the tempo selector 20 may comprise a knob with a range of tempos. For example, in some embodiment, the tempo may range from one to two hundred BPM. The tempo can then be dialed in manually to any of an infinite number of BPMs in the range.

The alternate means of selecting BPM may comprise the tap sensor 26. In some optional embodiments, the tempo selector 20 may be set to zero which initiates the tap sensor 26 to be ready for a manual input. The musician may physically tap a beat on the tap sensor 26 which will then make a BPM calculation to match the musician's finger taps and match that rate to the tempo output. When the tempo selector 20 is then later moved, the tempo selector 20 knob takes precedence over the tap sensor 26 and the tempo of the beat will then match that set on the tempo selector 20 indicator.

Yet another means of selecting BPM may comprise a holding down pedal 28 while no song is playing, and then tapping pedal 28 at the desired tempo rate. Further still, a dedicated tempo switch may be available so as to enable tempo switching during song playback. In yet further embodiments, tempo control may be provided via an expression pedal or a roller wheel integrated into the apparatus.

An optional functionality of the tap sensor 26 may be activated by, for example, tapping the tap sensor 26 only once. This may indicate to the processor controlling the apparatus to receive input from the pedal 28 or external footswitch to match the tempo inputted from the pedal 28 or tap sensor 26. This provides a means to adjust the tempo in an almost hands free fashion. Some musicians prefer to tap a tempo with their foot rather than with their finger.

Embodiments of the present disclosure provide the ability to produce a looped rhythm and have the ability to introduce short "fills" or embellishments to the rhythm. It may be desirable to be able to interject different fills into a rhythm at specific places in a musical piece. It may also desirable to have different looped rhythms in a single musical piece. Taken one step further, embodiments of the present disclosure may allow each different rhythm loop to have associated with it a series of fills specific to that rhythm loop. In other words, the device has the ability to cycle between a pre-determined series of MIDI rhythms, each having a pre-selected sub-set of available fills.

Figure 9:
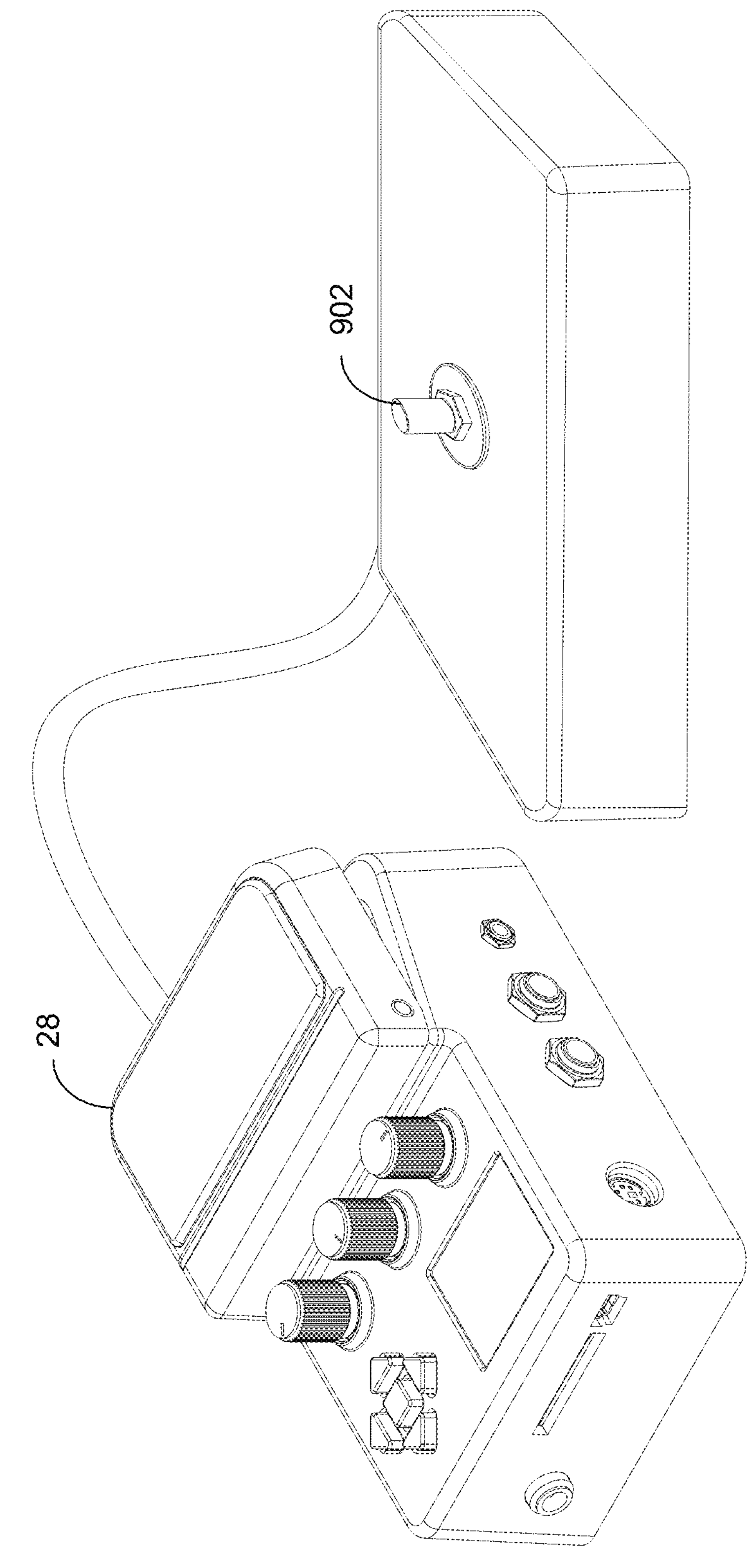
FIG. 9 illustrates a perspective view of an apparatus consistent with embodiments of the present disclosure.

Various embodiments with reference to FIGS. 2-3 disclose possible implementations of this functionality. Moreover, although FIGS. 2-3 disclose variations of the midi-sequence playback and interjection capability, FIGS. 8-9 illustrates yet another variation, which may be employed in separately or in combination with the aforementioned disclosure related to FIGS. 2-3.

In the example in FIG. 4 there are two rhythm loops identified as a first type ("A") and a second type ("B"). Both the first type and second type are individually associated with three pre-selected fills, designated with a numerical subscript. Segments 85 through 95 in FIG. 4 are an example of how the device might ideally work to play a complex percussion set. In this example, there are unique fills and a transition fill associated with each of loops "A" and "B", designated by subscript notation. Note that although this chart may be temporal, the length of time of any particular segment cannot necessarily be directly extrapolated. In other words, each segment may be played for a distinct length of time.

Still referring to FIG. 4 where the percussion sequence begins with a tap of the foot pedal 28 and loop segment 85 begins the first rhythm loop "A", which may repeat indefinitely. To introduce a fill, the musician taps the pedal 28 again to begin fill segment 86. Fill segment 86 concludes after it completes one play of the fill and then automatically reverts to rhythm loop "A", beginning loop segment 87, which repeats indefinitely.

At the musician's subsequent tap onto pedal 28, fill segment 88 begins consisting of a new distinct fill. When that fill plays once through, the beat again returns automatically to rhythm loop "A" represented by loop segment 89. Yet a third distinct fill may be initiated by another tap onto the pedal 28 represented by fill segment 90 which when completed reverts back to rhythm loop "A" in segment 90*a*. Continuing the example in FIG. 4, the musician taps the pedal 28 again and the fill segment cycle repeats by again playing fill variation one, shown in segment 90*b*. Once this fill segment completes rhythm loop "A" returns in segment 90*c*. The user then presses and holds down pedal 28 and the transition fill may be initiated as demonstrated in segment 90*d*. When the pedal 28 is released, segment 91, the next in the series of rhythm loops, identified in this example as "B", may be initiated and begins cycling indefinitely. Pedal 28 may be tapped to begin segment 91*a* and the first fill associated with this rhythm loop may be played once and then reverts to rhythm "B" in segment 91*b*. The second fill sequence associated with rhythm "B" begins with another tap to the pedal 28 at segment 92 and naturally reverts the rhythm loop "B" in segment 93. Alternatively, these fills may be set to play in random, rather than sequential, order. A transition fill, designated by segment 94 may be initiated by holding the pedal 28 and when released the next rhythm loop, in this example back to type "A" is begun as shown in segment 95. If the user holds down pedal 28, the transition fill may be played (and looped, if necessary) for the duration of the hold. Once the user releases the pedal, the transition fill will end at the nearest beat or alternatively, at the end of the musical measure.

Although the chart in FIG. 4 shows two rhythm loops, each having three associated fills, it must be appreciated that with enough memory and processing power that there may be a many rhythm loops each with a large number of fills. The number of rhythm loops and fills utilized may be largely limited by how many the musician has the ability to manage and play. For most songs a musician might use about no more than ten rhythm loops with each having ten or fewer fills. This is in no way limiting to the capability of the device, because, with sufficient memory and processing power, there may be no practical limit to the number of rhythm loops and associated fills that could be programmed.

Similarly, in some scenarios the device may be programmed with fewer rhythm loops and fills than shown in FIG. 4. For example, a musician may prefer to have two rhythm loops with each having only one or two associated fills. This may be easier for the musician to manage while the device could retain the expanded functionality to add more complex patterns at other times.

Further, in some embodiments, the apparatus may be configured to enable the user to insert a desired fill sequence into a main midi-sequence. Accordingly, the apparatus may include a plurality of foot-operated switches configured to operate the midi-sequence module. Further, a first set of foot-operated switches may be configured to trigger a corresponding main midi-sequence from a plurality of main midi-sequences. Additionally, a second set of foot-operated switches may be configured to trigger a corresponding fill sequence from a plurality of fill sequences to be interjected into a main midi-sequence. Accordingly, a user may be able to trigger a main midi-sequence by activating a first foot-operated switch and interject a fill sequence into the main midi-sequence by activating a second foot-operated switch associated with the fill sequence.

Further, in some embodiments, the second set of foot-operated switches may be associated with a plurality of fill sequences. Additionally, the plurality of fill sequences may be characterized by a corresponding plurality of intensity levels.

Further, in some embodiments, each of the second set of foot-operated switches may be associated with a common fill sequence. Additionally, each of the second set of foot-operated switches may be further associated with an intensity level characterizing the common fill sequence. Furthermore, in some embodiments, wherein the second set of foot-operated switches may include three switches, such as 802, 804 and 806 as illustrated in FIG. 8. Further, a first switch 802 may be associated with a low intensity level, a second switch 804 may be associated with a medium intensity level and a third switch 806 may be associated with a high intensity level.

Further, in some embodiments, at least two switches of the second set of foot-operated switches may be configured to trigger each of the common fill sequence characterized by a first intensity level and the common fill sequence characterized by a second intensity level. For example, activating each of the first switch 802 and the second switch 804 may cause both a low intensity version and a medium intensity version of the common fill sequence to be interjected together into a main midi-sequence.

Further, in some embodiments, a foot-operated switch of the second set of foot-operated switches may be configured to cause a transition from a main midi-sequence to a fill sequence associated with the foot-operated switch. For example, the foot-operated switch may be configured to cause the transition based on holding down of the foot-operated switch.

Further, in some embodiments, the apparatus may further include a third set of foot-operated switches configured to trigger a plurality of accent hit sounds to be interjected into a main midi-sequence.

In some embodiments of the present disclosure, every time an input causes a change in the MIDI, loop or fill playing, such as tapping pedal 28, the background of the display 24 may change colors to visually indicate the change in the state of the midi-sequence output being played by the device. For example, in some embodiments of the present disclosure, the display 24 may show a red background during the intro and/or outro, a green background during a song part, a yellow background during a fill, and a white background during a transition and a black background while paused. In this way, a user of the device may be easily enabled to determine which midi-sequence is playing and, therefore, will be enabled to better discern the action that may be taken by the device upon a subsequent tap of pedal 28. The user may be enabled to program the sequence of the rhythms, their corresponding display colors, and corresponding functionality of the pedal 28 within those sequences though a user-interface of associated software. As mentioned above, the user-interface may be adapted on a docked mobile device or other external connection to the device.

Consistent with embodiments of the present disclosure, display 24 may indicate which songs, parts of songs (e.g., as corresponding to, for example, header 545 in FIG. 5C), beats, fills, and/or accents are currently being played (or will be played in the future).

Furthermore, in some embodiments of the present disclosure, the background of display 24 may be enabled to visually display the current beat that is being played. Display 24 may display in writing what the current time signature is (for example, "4/4" indicating there are four beats in the measure). Display 24 may further provide a visual representation of each beat in the measure as the beats progress through the measure. For example, if the song has four beats per measure, the background of display 24 may be segmented into four equal portions. Each portion may be sequentially illuminated to indicate the progression of the beat in the measure. Accordingly, the first beat of the measure may be indicated by display 24 with a color of the first segment distinguished from the remainder three segments. For the second beat of the measure, the color of first segment may now be restored to its original shading while the second segment may now be distinguished in color. Similarly, for the third beat of the measure, the third segment of the display may be distinguished in color while the remainder of the segments maintains a uniform color. Finally, for the fourth beat of the measure, the fourth segment may be distinguished in color while the remainder segments maintain their uniform color. In this way, a user of the apparatus may be able to quickly derive the beat within the measure by viewing which segment of display 24 has a differentiating display characteristic.

Still consistent with the embodiments of the present disclosure, display 24 may indicate a progression of the beat with a vertical bar propagating across display 24. In others words, during a first beat of the measure, a vertical bar may be displayed at a first position. Then, during a second beat of the measure, the vertical bar may be displayed in a second position that is adjacent to the first position. If the time signature changes to a different measure, the width of the vertical bars may change to become longer for a lower number of beats per measure, or shorter for a greater number of beats per measure. In this way, a user may be enabled to visually keep track of how many beats there are in the current measure, how many beats in the current measure have already been played and how many remain. It should be understood that the previous description of the use of vertical bars to indicate beats with in a measure is merely illustrative and this concept may be displayed in a variety of visual representations other than vertical bars.

A port 57 for an external switch may be provided. This external switch may be a dumb foot switch that acts as a signaling means to cause the device to overlay a pre-selected sound, such as a hand clap, cymbal crash, or any other single-shot sound, to be played by the device. FIGS. 2-3 show an accent switch 245 providing similar. Alternatively, the external switch may contain an external audio generator that contains its own single-shot sound that may then be incorporated into the sounds generated by the device itself and transmitted on to an external amplifier through the outputs 40.

In some embodiments of the present disclosure, an external foot switch may be operable to pause and unpause the MIDI sequence that is currently being played by the device. The device may be set to continue playing where the loop was paused or alternatively to restart the loop from the beginning when unpaused in order to allow the musician easier rhythmic coordination. Additionally, a second external foot switch may be operable to advance to the next MIDI sequence in the program, or act as a dedicated tap tempo input so the user can enter tap tempo mode hands free while playing and change the tempo as the song is being played. Furthermore, one or more expression pedals, such as for example, pedal 902 as illustrated in FIG. 9, may be paired with the device in order to control various sound aspects, such as but not limited to, volume, tempo and dynamics (for example, making the drums hit harder or softer, controlled by MIDI values 0-127). The function of one or more external foot switches or expression pedals may be programmed by the user through a software interface associated with the apparatus.

Power may be supplied to the device by an internal supply such as a replaceable or rechargeable battery. It is anticipated that a common Lithium Ion battery would be sufficient. If the device is included in a rack system or daisy chained to other effects pedals, an external wired power supply may also be delivered to the device via a power supply interface means such as shown by port 34.

Inputs 30 are provided to receive an external audio source such as other effects pedals or instruments such as a keyboard or guitar. These inputs 30 are available for stacking a variety of devices in a daisy chain format where all signals generated by a variety of devices are funneled through a single stream through the outputs 40 to a final stage such as a mixing board, amplifier and speaker combination, or other device designed for receiving line level input from the device. The inputs 30 may channel the incoming audio stream through the audio processors integral to the device, or may alternatively bypass the signal processing capability of the device and deliver an unaltered signal to the outputs 40 where the signal may be combined with the processed signals generated by the device.

Inputs 30 may be designed to readily accept digital or analog audio signals in monophonic (mono), stereophonic (stereo) or other multi-track format. If a known signal source is mono, then one specific channel may be designated as such. Similarly, the outputs 40 may be digital or analog and carry any pre-designated number of parallel signals, typically mono or stereo format.

The device may be highly flexible and adaptable due, inter alia, to its internal signal processor and memory module. The memory module may be adapted to store a plurality each of MIDI percussion segments, MIDI fills, MIDI instrument voice processes, style processes and other related data to perform the functions described, herein. In various embodiments, the memory module may be pre-loaded with several MIDI drum set voices, several MIDI style processes, and a number of rhythm loops and fills. In this form, the device can be used directly off the shelf.

For more sophisticated users the device can be interfaced with an external computer device via a port 38 which may take the form of universal serial bus (USB) port or other type of interface commonly available in the art. Similarly, the device may have a wireless communication means such as Wi-Fi, Bluetooth or other wireless communication means that may become commonly available as technology progresses from time to time. Port 38 may also be used to plug in external LCD screen to more clearly display the contents of display 24.

Additionally, available as an option may be an external memory card slot 32 that can provide other rhythms, voices, processes and other data that may be used by the device. Current technology for a card slot 32 interface could be memory cards, flash drives, solid state drives or other types of data storage or transmission means that may become available from time to time as technology progresses. The memory card slot 32 may be utilized to deliver additional content to the internal memory means provided with the device or may augment the provided on board storage capacity that is integral to the device.

Figure 5A:
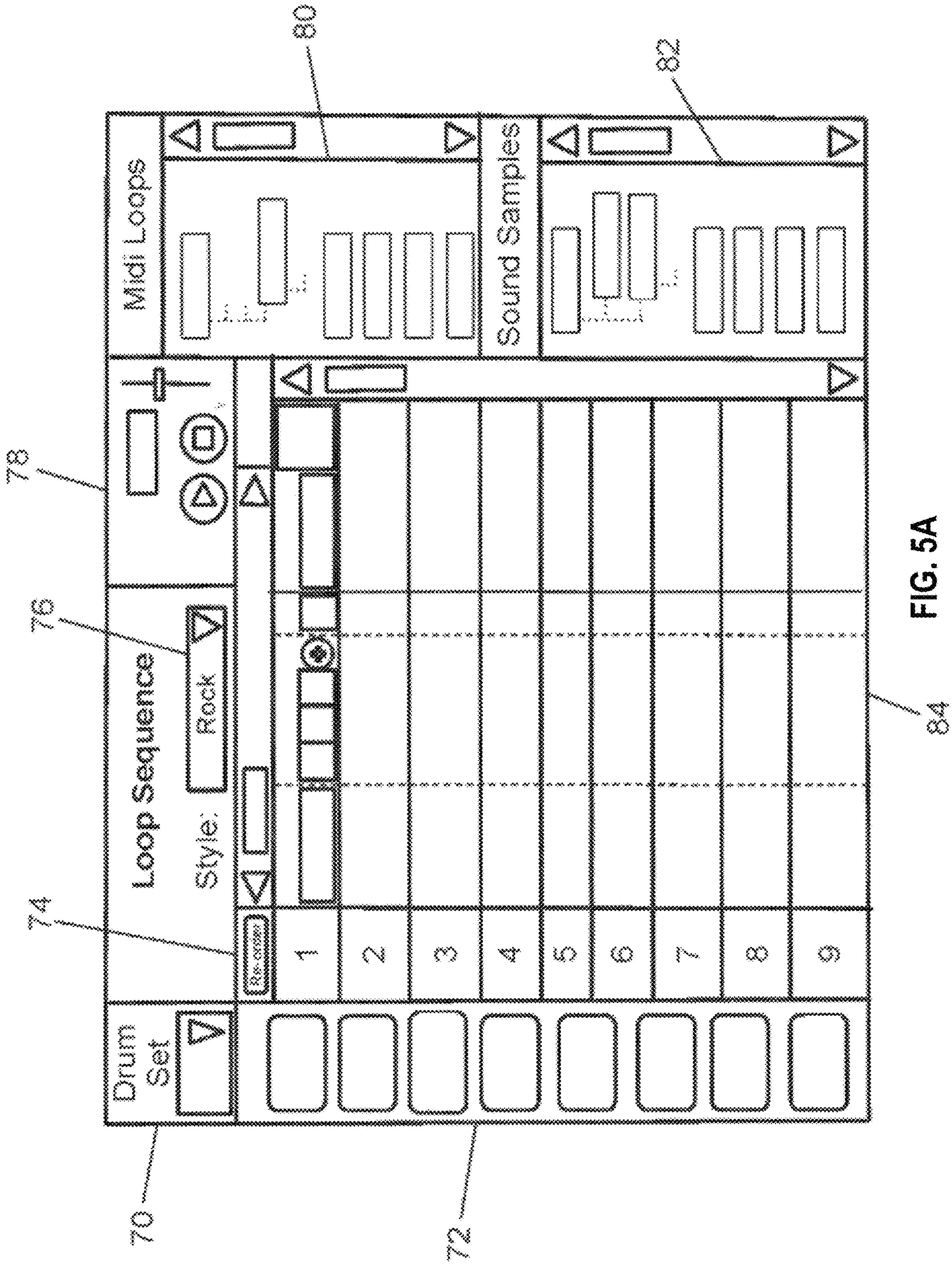
FIG. 5A illustrates an example of a screen shot of a control panel screen.

FIG. 5A is one example of what a software interface screen shot might look like. The interface may be provided on a mobile device docked or connected to the apparatus (as described above with reference to FIGS. 2-3), or on a computer connected to the apparatus. The computer could be a personal computer directly connected to the device via a cable to the port 38 or connected wirelessly. If wirelessly, then the device could be Internet connected and would then be accessible anywhere on the cloud from other portable devices. Some mixing boards or other audio equipment may also be designed to interact with the device to make changes to the MIDI files, rhythms, loops, fills, drum sets, sound samples, processes or other variables stored on the device or affecting how the audio generated is manipulated or produced. It may also include a selection of whether the signal received from the inputs 30 is filtered through the processor logic or simply passes unaffected to the outputs 40 on the device.

When the device is interfaced with a computer or docked mobile device, a software program can be used to manipulate the various features of the device and the software interface may appear similar to the example shown in FIG. 5A that comprises, inter alia, a drum set 70 identifier with instrument voice definitions for the component instruments 72. Here the drum set 70 can be conveniently categorized and named according to the musician's needs. For each drum set 70 the several component drums can be set individually as component instruments 72. Typically, the component instruments 72 are individual MIDI instrument voice instructions or processes that may simulate, for example, a specific snare drum or type of cymbals, which give personalized characteristics to each individual instrument. Drum set elements are sound files, for example MP3 or WAV files. Multiple drum sets 70 may be organized, each having a predetermined set of component instruments 72. By dragging and dropping individual files from the host computer the manipulation of component instruments is easily made and verified in a graphical format.

By organizing the drum set 70 from individual files of instrument voice files in memory, storage space may be saved by merely referencing the instrument voice as a component instrument 72 from a catalog held in the storage means. If needed, the musician may then substitute out an instrument voice from a specific component instrument 72 instead of creating a whole new drum set 72 which is an inefficient use of storage space. This also provides for maximum flexibility of what a drum set 70 may sound like.

The style of the loop sequence 76, such as rock, metal, jazz or others, can be set for a particular set of percussion loops. For testing purposes, the percussion selection may be played with options in the control pane 78. The several MIDI loops may be organized and changed in pane 80, which references the style selector 18 found on the device.

Sound samples 82 can also be moved in a drag and drop fashion to any of the other panes in the computer interface screen. This may include a browse-able library of loops, fills, instrument voices, processes and any other files which may be utilized for the various effects and uses of the device.

The main window 84 may be where the queued loops and their associated fills may be established. In this example shown in FIG. 5A, there are two main drum loops and an auxiliary sound defined. The auxiliary sound may be executed with an external foot pedal connected to the port 38. The first drum loop has three fills designated. More drum loops may be added into the sequence for a particular set. The sets are numbered from one to nine in this example, but may be expanded to include any number of sets. The sets may be easily re-ordered by selecting the "re-order" function. Alternatively, all of these files and functions may be controlled with the drag and drop method.

Figure 5B:
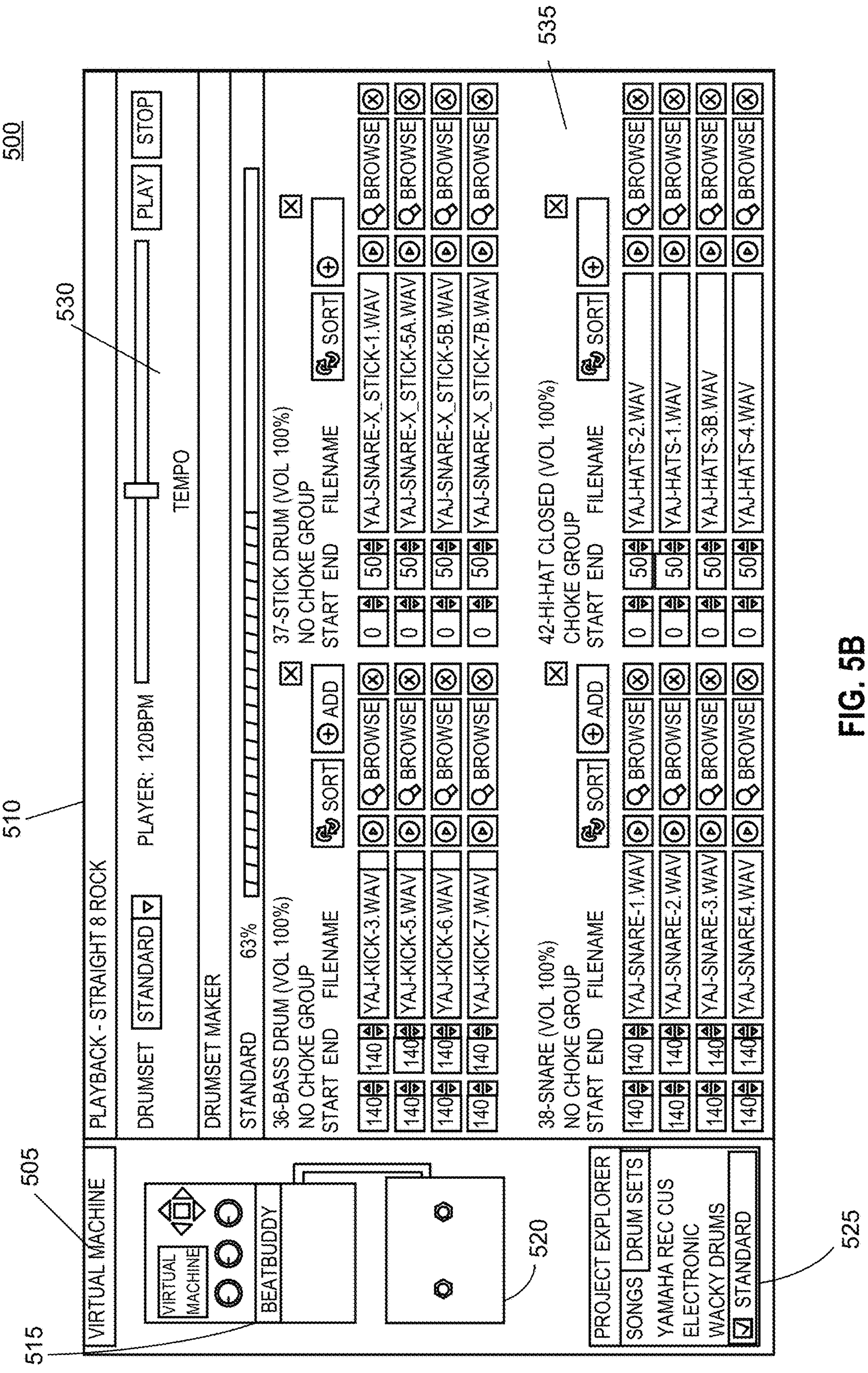
FIG. 5B illustrates an example of another screen shot of a control panel screen.

FIG. 5B illustrates another embodiments of what a software interface 500 might look like. Software interface 500 may be, for example, a virtual machine enabling a computing device (e.g., docked mobile device), to simulate the functionality and switches of a connected apparatus.

The interface may comprise a first frame 505 and a second frame 510. First frame 505 may show a graphical rendering of the apparatus 515, as well as any connected foot switches or expression pedals. In some embodiments, the connected peripherals 520 (e.g., foot switches or expression pedals) may only be displayed if their connection is detected. Still consistent with embodiments of the disclosure, a user may click on a graphically rendered switch or knob of the displayed device to set its desired functionality. Accordingly, the switches and knobs of the apparatus may be programmed through the software interface in this way.

In yet further embodiments, first portions of displayed apparatus 515 and displayed peripherals 520 may act as a selectable button that may be activated by a user to initiate the various fills and beats of a song. In turn, a tap of pedal 28 may cause a similar functionality.

First frame 505 may further comprise a project explorer window 525 where the user may select different songs and drum sets. In various embodiments, using, for example, selectors on the apparatus may enable a user to, for example, navigate the project explorer upon the users selection of a new song or project with the selectors. In this way, a selection on the apparatus itself may impact a display or cause an action in the software interface.

Second frame 510 may comprise a playback window 530 and a drum-set maker window 535. Playback window 530 may enable a user to select a drum-set, a tempo, and initiate a playback of the selected drum-set and tempo. Drum-set maker window 535 may enable a user to customize the sounds and tones associated with the drum-set, much like that as described for FIG. 5A.

To improve the functionality of the software, custom file extensions, preferably having a proprietary format will be utilized. For example, in some embodiments of the software a ".bdy" file extension may be used to save the profile of the user including most settings for the way the device may be configured by default for that user, including drum sets, drum sequences, etc. The user can then load this file on another copy of the device and get the exact same setup. Alternatively, the user may then be able to have multiple profiles, one for each ".bdy" file. This is beneficial, for example, if the user is playing a different concert which needs different sequences and drum sets, he can quickly load this ".bdy" file and have the device set up in a customized way.

Another proprietary extension used with the software may be a ".seq" file extension which may designate a loop sequence file. This file will be a combination of the MIDI and WAV files that make the loop sequence (or "song"). This allows the user to save a loop sequence he likes and use it on another copy of the device or share it with his friends without having to re-build it again out of the separate MIDI and WAV files.

Yet another proprietary extension used with the software may be a ".drm" file extension which may designate a drum set file. This file may save the combination of WAV files used in the drum set. The user can make his own drum set and then share it with his friends by just sending this file instead of all the separate WAV files and avoids having to re-build the drum set instructions again in the interface software.

Figure 5C:
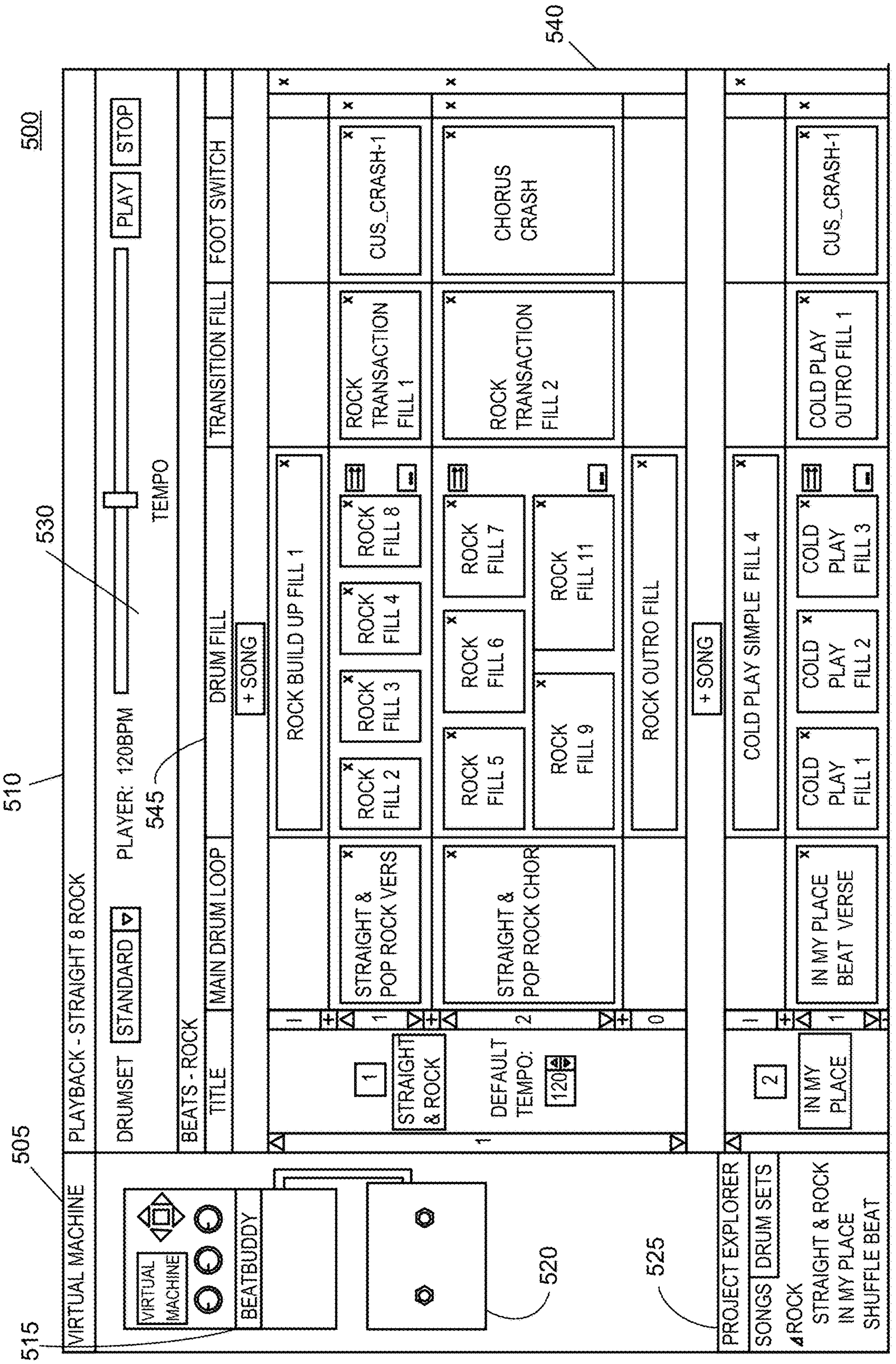
FIG. 5C illustrates an example of yet another screen shot of a control panel screen.

There may be a variety of software packages that can be used to manipulate various features of the device. FIG. 5C illustrates yet another embodiment of what a software interface 500 might look like. Software interface 500 may further comprise song window 540. Within the song window 540, a user may be enabled to create and save a list of songs, wherein each song may be comprised of, but not limited to, for example, an intro fill, a first verse beat, fills associated with the verse beat, a transition fill, a second verse beat (a chorus beat), fills associated with the second verse beat and an outro fill. The corresponding portions of song may be labeled in columns in header 545. It should be noted that when a user accidentally triggers the playing of a fill (e.g., an outro fill), the user may cancel the accidental trigger by quickly tapping on pedal 28 again.

The sound files may be stored as 16 or 24 bit WAV files. Likewise, the foot switch portion of the icon may act as a button to trigger these WAV files. The software may enable a user to add fills to a song by selecting standard general MIDI files in any time signature. The software may also enable a user to delete fills in the song. The software may provide a button that allows a user to select whether to play fills in either sequential or in random order. The software may further enable a user to add additional song parts (such as a bridge), rearrange song parts, and delete song parts. The software may enable a user to select different drum set types to play each song. Songs may be arranged in any order such that a user may create a specific set list. The software may further enable a user to export a song as a single file or backup the entire content of the device, so that it may be stored or shared. The user may then use pedal 28 to navigate and playback the various programmed sequences, while viewing a corresponding color associated with those sequences (or group of sequences) on the device display. In various embodiments, the device display, as well as the software interface, may be provided by a mobile device docked to the apparatus.

The software may further enable the use of specialized temporary "choke groups" to allow the smooth transition between any two percussion loops. Generally speaking, a choke group is used to tell a superseding instrument to mute the sound of a preceding instrument if it is still being played when the superseding instrument begins to play. For example, when an open hi-hat is played, the sample can last for two or three beats if just left ringing unchecked. If it is followed by a closed hi-hat being played, the closed hi-hat sound will "choke" or mute the open hi-hat sample, such that they are not both sounding at the same time. The software may enable the use of choke groups to conditionally mute certain instruments in the drum kit transitioning between different loops, such as main beats and fills. This may be beneficial because many fills end with a crash, and many main beats start playing with a hi-hat or a ride cymbal, however a real drummer would generally never play a hi-hat or ride cymbal on the very first beat together with the crash, therefore the use of choke groups create a more realistic sound. As such, when certain notes end the fill (for example, a crash), certain other notes (for example, a hi-hat or ride cymbal) may be omitted if present in the first sixteenth (1⁄16), or some other pre-determined period of time, of a beat of the main beat. This also applies when beginning a fill. For example, if the main beat played a crash when the fill was triggered, the hi-hat or ride cymbal may be omitted in the beginning of the fill. Additionally, the specialized temporary choke group can omit notes if the same note is present within a determined time period of time after transitioning to a new loop, such a fill. This will prevent the same note from being played in succession too rapidly to sound natural. For example, when using samples (e.g., midi or audio) that were recorded by a real drummer, rather than created by a computer program, the notes are not exactly on beat as there are variations to a real drummer's playing. This would mean that when transitioning between two midi loops, if a drummer hit the kick drum slightly early at the end of one loop and slightly late at the beginning of the loop that is being transitioned into, the kick drum would be triggered twice in very rapid succession, creating an unnatural repeating or delay effect. This choke group would prevent the second note from being played if it is too close to the first note. This may allow any fill to be used with any main beat and the smooth transition between any two percussion loops and avoids playing conflicting notes at the same time or too rapidly in succession.

In some embodiments of the present disclosure, a user may be enabled to pre-program tempo presets for individual song parts using the pedal 28 and/or a mobile device paired with the device. The programming may be done by, for example, using pedal 28 in conjunction with the software interface. As mentioned above, the software interface may be provided through a mobile device docked or otherwise connected to the apparatus.

The user may want to select specialized transition fills to shift from verse to chorus and chorus to verse. For example, when the user wants to switch from verse to chorus, he may press down the pedal and hold it down. The transition fill may be played over and over until he releases the pedal and the beat reverts back to the subsequent percussion segment of the underlying drum loop. In this way, the user may be enabled to transition between drum parts more in the way an actual drummer would by timing the switch exactly by lifting his foot off the pedal when he wants the switch to take place. The transition may take place at the end of the musical measure to keep the rhythm in time. A similar procedure may be followed when the user wants to switch from chorus back to verse.

The device can also be fairly described as a percussion signal generator comprising a memory module, a foot operable pedal, an audio signal output and a signal processor. The memory module stores a plurality of percussion-segments and a plurality of fills that are adapted to be executable audio files. The percussion-segments are adapted to be played in a perpetual loop, playing seamlessly from the end of the loop and starting again at the beginning indefinitely. The memory module can store one or more pre-determined fill-subsets comprised of a sequence of one or more of said fills and each percussion-segment has an associated fill-subset of one or several distinct fills. The memory module can store at least one pre-defined percussion-compilation comprised of one or more of said percussion-segments, sequentially ordered and combined with said associated fill-subset.

The processor module may be adapted to execute said audio files resulting in generation of a percussion signal and delivery of said percussion signal to said audio signal output. Simultaneously, the signal processor may be adapted to receive and recognize from said foot operable pedal any of several cues. When a discrete percussion-compilation is selected a first cue causes said signal processor to execute a first of said percussion-segments of a said discrete percussion-compilation. When the first cue is repeated, it may cause the signal processor to execute a selected fill in an associated fill-subset and then revert again to the same percussion-segment. A repeat of the first cue may cause the signal processor to execute a subsequent fill in the associated fill-subset or if the final fill of said associated fill-subset has been executed then the first fill in said associated fill-subset is again executed and then revert again to the same percussion segment. A second type of cue may cause the signal processor to execute the subsequent percussion-segment of the percussion compilation and individual instances of the first cue cycle through one of each sequential, associated fill-subset. A third cue may cause the signal processor to cycle through executing subsequent associated fills without interruption. A fourth cue may stop the execution of said percussion compilation.

Variations of the percussion signal generator can further include a signal input means that may receive a music signal feed from an external source and an adjustable reverb effect generator that imparts a reverb effect onto the music percussion signal without affecting the percussion signal and delivering said music signal and said percussion signal to said audio signal output. Generally, the percussion segments and fills may be comprised in any format currently know in the art or combination thereof, including for example MIDI, WAV or MP3. In further embodiments, the device may use non-proprietary files, such as open source formats, and may be compatible with proprietary formats developed by other entities.

The device may include a memory card slot, an external signal generator, an external power supply and/or an external computer connector. Optionally, a style selector, a tempo selector or a drum set selector may be included individually or in combination to further control the percussion signal generated or to affect the music signal passing through the device from another source, such as a guitar.

Still consistent with embodiments of the present disclosure, electric drum pads may be connected to the apparatus. The connection may be a wired or wireless connection. Each drum pad may be assigned a function. The function may be, for example, a function that would otherwise be controlled by pressing the pedal or footswitches. In this way, a user may be enabled to control the device by hitting one or more of the connected drum pads. Accordingly, electric drum pads may serve as additional switches that, upon activation, trigger functionalities of the apparatus much like the footswitches and pedals associated with the apparatus.

In yet further embodiments, a 'song part' button may be provided. The button may be configured to cycle through multiple song parts (e.g., 1>2>3>back to 1) to 'arm' the song part that will start playing after the main pedal is operated to begin a transition. In this way, the user has the ability to select which next song part to transition to, without being required to sequentially go through the song parts. In some embodiments, two 'song part' buttons may be provided—one for forward cycling through the song parts, and another for backward cycling.

The foregoing description conveys the best understanding of the objectives and advantages of the present disclosure. Different embodiments may be made of the inventive concept of this device. Although certain buttons, switches, functions, and features were described with reference to the 'device' or 'apparatus', it should be understood that those buttons, switches, functions, and/or features may be integrated into external or add-on devices in operative communication with the 'device' or 'apparatus'. It is to be understood that all matter disclosed herein is to be interpreted merely as illustrative, and not in a limiting sense. Furthermore, though various portions of the present disclosure reference "midi" sequences or notes, it should be understood that the scope of the present disclosure is intended to cover non-midi audio sequences as well.

III. Software and Computing Device

Figure 6:
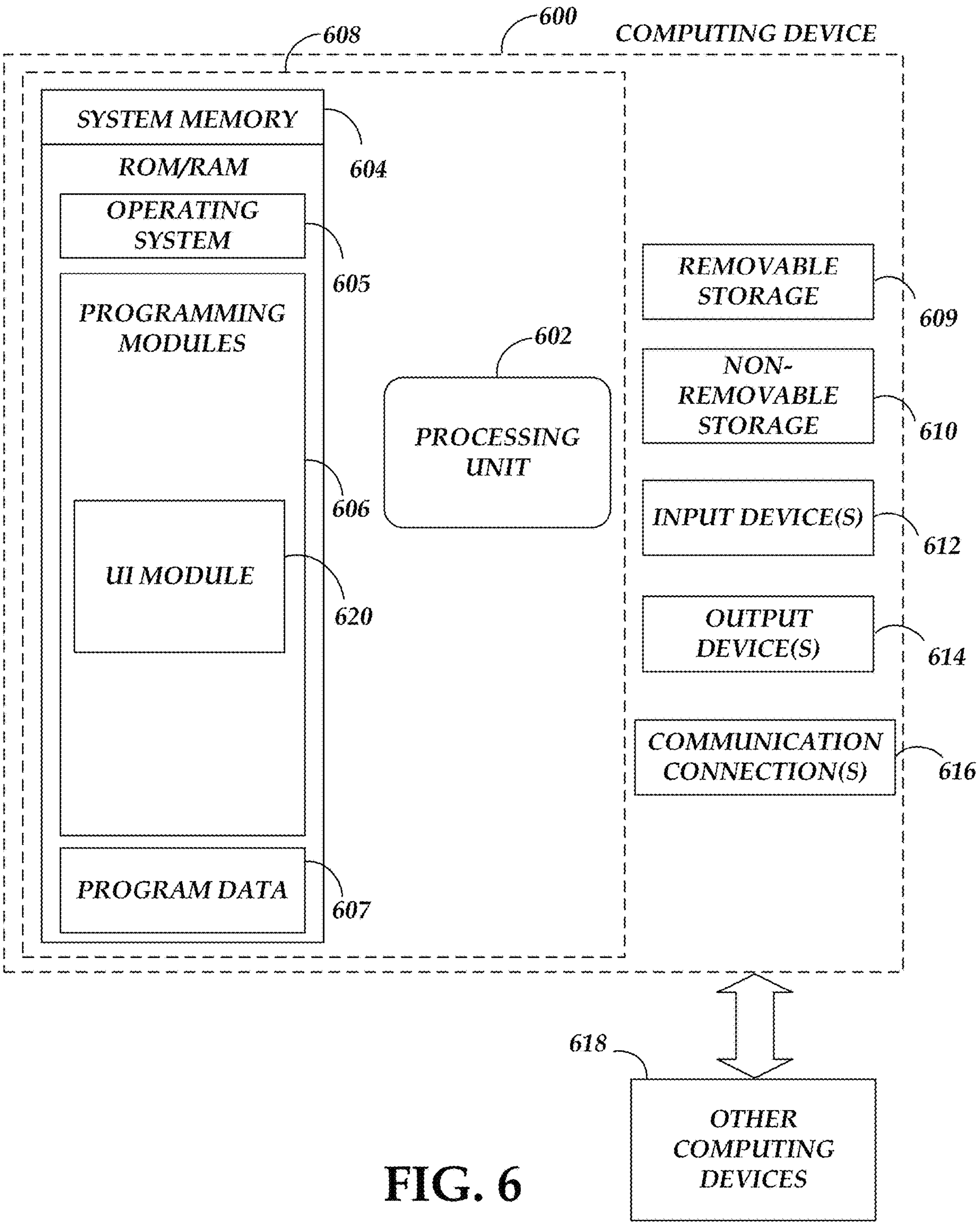
FIG. 6 is a block diagram of a computing device consistent with embodiments of the present disclosure.

As mentioned above, various operations may be performed on the apparatus itself or (separately or in combination with) a mobile computing device docket or otherwise connected to the apparatus. FIG. 6 is a block diagram of a system including computing device 600, which may comprise either the mobile computing device docketed to the apparatus, or be internal to the apparatus itself. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure. Furthermore, computing device 600 may comprise an operating environment for system 100 as described above. System 100 may operate in other environments and is not limited to computing device 600.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include a user interface module 660 for providing, for example, the user interface shown in FIG. 5. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., user interface module 620) may perform processes associated with providing a user interface. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, any disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claim such additional disclosures is reserved.

The following is claimed:

1. A system comprising:

a memory storage; and a processing unit coupled to the memory storage, wherein the processing unit is configured to:

playback a main midi sequence in response to a first activation command associated with a first foot-operable switch to operate a midi sequence module, transition to a playback of another main midi sequence in response to a second activation command associated with the first foot-operable switch, and stop the playback of the main midi sequence, in response to a third activation command associated with the first foot-operable switch, wherein each of the first activation command, the second activation command, and the third activation command, are triggered based on, at least in part, a duration and frequency of a user application of the first foot-operable switch.

2. The system of claim 1, wherein the processing unit is further configured to:

operate an instrument signal looper in response to an activation command of a second foot-operable switch.

3. The system of claim 2, wherein the second foot-operable switch is associated with the instrument signal looper module of the system.

4. The system of claim 3, wherein the processing unit is further configured to:

provide and receive midi data and audio data to and from at least one of the following: the drum machine module and the instrument signal looper module.

5. The system of claim 4, wherein the processing unit is further configured to operate in conjunction with a digital audio workstation.

6. The system of claim 5, wherein the digital audio workstation is configured to operate with at least one of the following: the drum machine module and the instrument signal looper module.

7. The system of claim 1, wherein the processing unit is further configured to:

commence a recordation of a signal received from an instrument input in response to a first activation command of a second foot-operable switch.

8. The system of claim 7, wherein the processing unit is further configured to:

stop the recordation of the signal received from the instrument input in response to a second activation command of the second foot-operable switch.

9. The system of claim 7, wherein the processing unit is further configured to:

Quantize a recorded loop in accordance to a tempo associated with midi playback.

10. The system of claim 7, wherein the processing unit is further configured to:

commence and stop the recordation of a signal at a time that is synchronized with a beat provided by a midi sequence module.

11. The system of claim 1, wherein, in response to one of a plurality of activation commands, the processing unit is further configured to:

playing back one of the plurality of main midi sequences, and playing back a recorded loop associated with the one of the plurality of main midi sequences.

12. The system of claim 11, wherein, in response to one of a plurality of activation commands, the processing unit is further configured to:

stop the playback of the main midi sequence, and stop the playback of the recorded loop.

13. The system of claim 1, wherein, in response to one of a plurality of activation commands, the processing unit is further configured to:

transition to a playback of the other main midi sequence, and transition from a playback of a first recorded loop to a playback of a second recorded loop.

14. The system of claim 1, wherein the processing unit is further configured to play back a fill midi sequence associated with the main midi sequence in response to a fourth activation command associated with the first foot-operable switch.

15. The system of claim 1, wherein each of the first activation command, the second activation command, and the third activation command correspond to signals generated from at least one of the following:

a signal rapid depression of the first foot-operable switch, two rapid depressions in succession of the first foot-operable switch, three rapid depressions in succession of the first foot-operable switch, and a long depression of the first foot-operable switch, wherein any one of the aforementioned corresponds to one or more of the plurality of activation commands.

16. The system of claim 1, wherein the first foot-operable switch is associated with a drum machine module of the system.

17. The system of claim 1, wherein the processing unit is further configured to:

commence a recordation of a signal received from an instrument input in response to a first activation command associated with a second foot-operable switch configured to operate a looping means, stop the recordation of the signal received from the instrument input in response to a second activation command associated with the second foot-operable switch, initiate a playback of a recorded loop in response to a third activation command associated with the second foot-operable switch, and overdub the recorded loop in response to a fourth activation command associated with the second foot-operable switch, wherein each of the plurality of activation commands are triggered based on a duration and frequency of a user application of the second foot-operable switch.

18. An apparatus comprising:

a memory storage; and a processing unit coupled to the memory storage, wherein the processing unit is configured to:

playback a main midi sequence in response to a first activation command associated with a first foot-operable switch to operate a midi sequence module, transition to a playback of another main midi sequence in response to a second activation command associated with the first foot-operable switch, stop the playback of the main midi sequence, in response to a third activation command associated with the first foot-operable switch, wherein each of the first activation command, the second activation command, and the third activation command, are triggered based on, at least in part, a duration and frequency of a user application of the first foot-operable switch, and operate an instrument signal looper in response to an activation command of a second foot-operable switch.

19. The apparatus of claim 18, wherein the processing unit is further configured to:

commence a recordation of a signal received from an instrument input in response to a first activation command associated with a second foot-operable switch configured to operate a looping means, stop the recordation of the signal received from the instrument input in response to a second activation command associated with the second foot-operable switch, initiate a playback of a recorded loop in response to a third activation command associated with the second foot-operable switch, and overdub the recorded loop in response to a fourth activation command associated with the second foot-operable switch, wherein each of the plurality of activation commands are triggered based on a duration and frequency of a user application of the second foot-operable switch.

20. The apparatus of claim 18, wherein the second foot-operable switch is an external midi foot switch.

* * * * *